United States Patent
Park et al.

(10) Patent No.: US 10,389,498 B2
(45) Date of Patent: Aug. 20, 2019

(54) SIGNALING METHOD FOR COMP OPERATION IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 37 days.

(21) Appl. No.: 15/501,795

(22) PCT Filed: Jul. 31, 2015

(86) PCT No.: PCT/KR2015/008030
§ 371 (c)(1),
(2) Date: Feb. 3, 2017

(87) PCT Pub. No.: WO2016/021880
PCT Pub. Date: Feb. 11, 2016

(65) Prior Publication Data
US 2017/0237535 A1      Aug. 17, 2017

Related U.S. Application Data

(60) Provisional application No. 62/033,086, filed on Aug. 4, 2014.

(51) Int. Cl.
*H04L 5/00* (2006.01)
*H04W 72/04* (2009.01)
(Continued)

(52) U.S. Cl.
CPC .......... *H04L 5/0035* (2013.01); *H04B 7/024* (2013.01); *H04B 7/0478* (2013.01); *H04W 72/0426* (2013.01); *H04B 7/065* (2013.01)

(58) Field of Classification Search
CPC ... H04L 5/0035; H04W 72/0426; H04B 7/024
See application file for complete search history.

(56) References Cited

U.S. PATENT DOCUMENTS

2013/0114427 A1  5/2013  Maattanen et al.
2014/0133325 A1  5/2014  Prasad et al.
(Continued)

OTHER PUBLICATIONS

PCT International Application No. PCT/KR2015/008030, International Search Report dated Nov. 24, 2015, 2 pages.
(Continued)

*Primary Examiner* — Jackie Zuniga Abad
(74) *Attorney, Agent, or Firm* — Lee, Hong, Degerman, Kang & Waimey

(57) ABSTRACT

Disclosed are a signal method for a CoMP operation in a wireless communication system and a device therefor. Particularly, the signaling method for a CoMP operation between base stations in a wireless communication system comprises a step of transmitting, by a first base station, first CoMP information to a second base station, wherein: the first CoMP information includes CoMP hypothesis set information which is a collection of CoMP hypothesis information for one or more cells, benefit metric information associated with the CoMP hypothesis set, start system frame number (SFN) information, and start subframe number information; the CoMP hypothesis is hypothetical physical resource block (PRB) specific resource allocation information for one cell; the start SFN information indicates a start wireless frame number of the first CoMP information; and the start subframe number information can indicate a start subframe number of the first CoMP information.

20 Claims, 18 Drawing Sheets

(51) Int. Cl.
  *H04B 7/024*    (2017.01)
  *H04B 7/0456*   (2017.01)
  *H04B 7/06*     (2006.01)

(56) References Cited

U.S. PATENT DOCUMENTS

2014/0293914 A1* 10/2014 Maattanen ........ H04W 72/1278
                                                    370/329
2015/0312893 A1* 10/2015 Prasad .................. H04B 7/024
                                                    370/328

OTHER PUBLICATIONS

Qualcomm Incorporated, "Inter-eNB CoMP: Hypotheses and Benefit Metric exchange", R3-141175, 3GPP TSG-RAN WG3 #84, May 2014, 6 pages.
Samsung, "Open issues in WI: Inter-eNB CoMP for LTE", R3-141374, 3GPP TSG-RAN WG3 #84, May 2014, 4 pages.
Fujitsu, "Discussion on Stage 3 completion for Inter-eNB CoMP", R3-141139, 3GPP TSG-RAN WG3 #83, May 2014, 5 pages.

* cited by examiner

[FIG. 1]
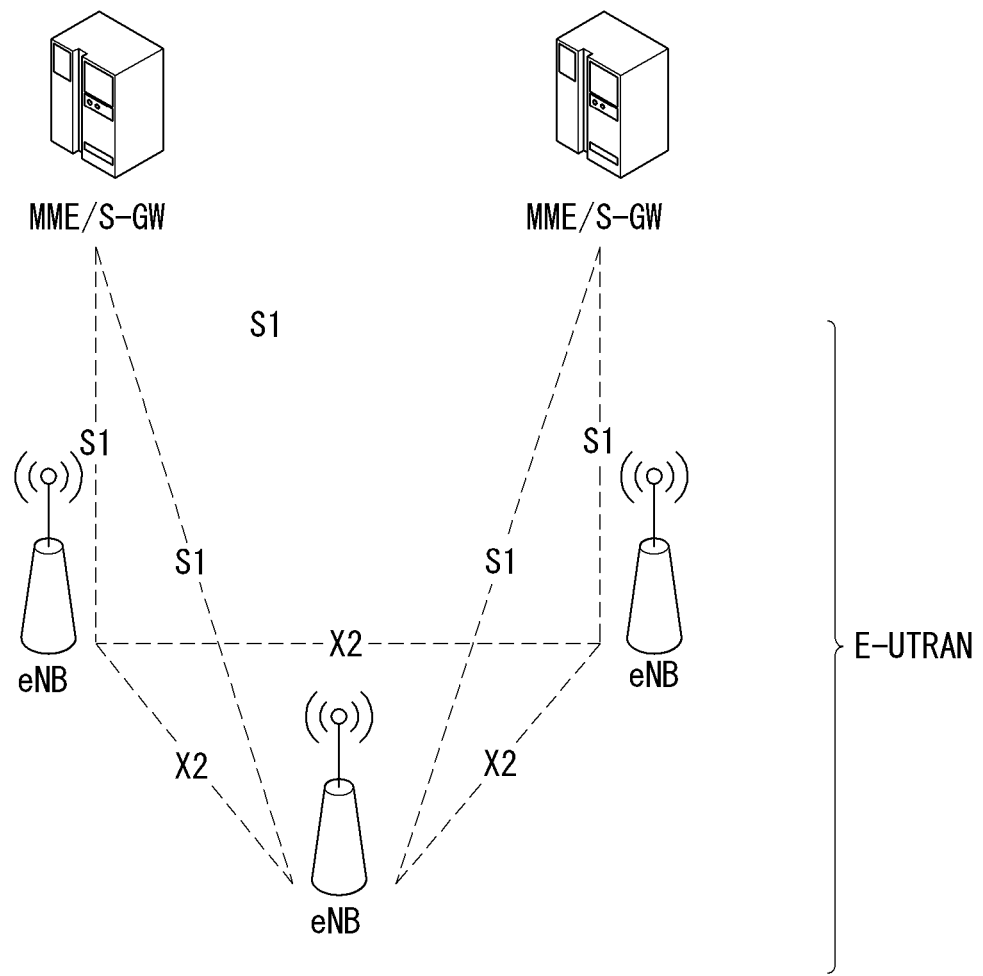

[FIG. 2]
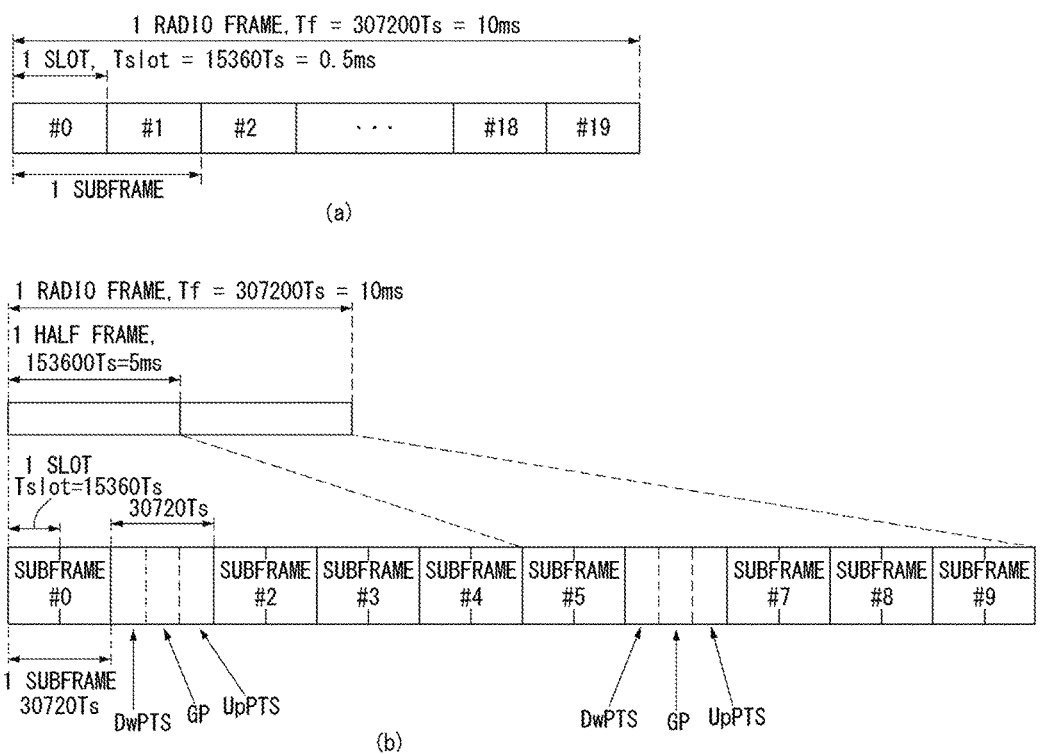

[FIG. 3]
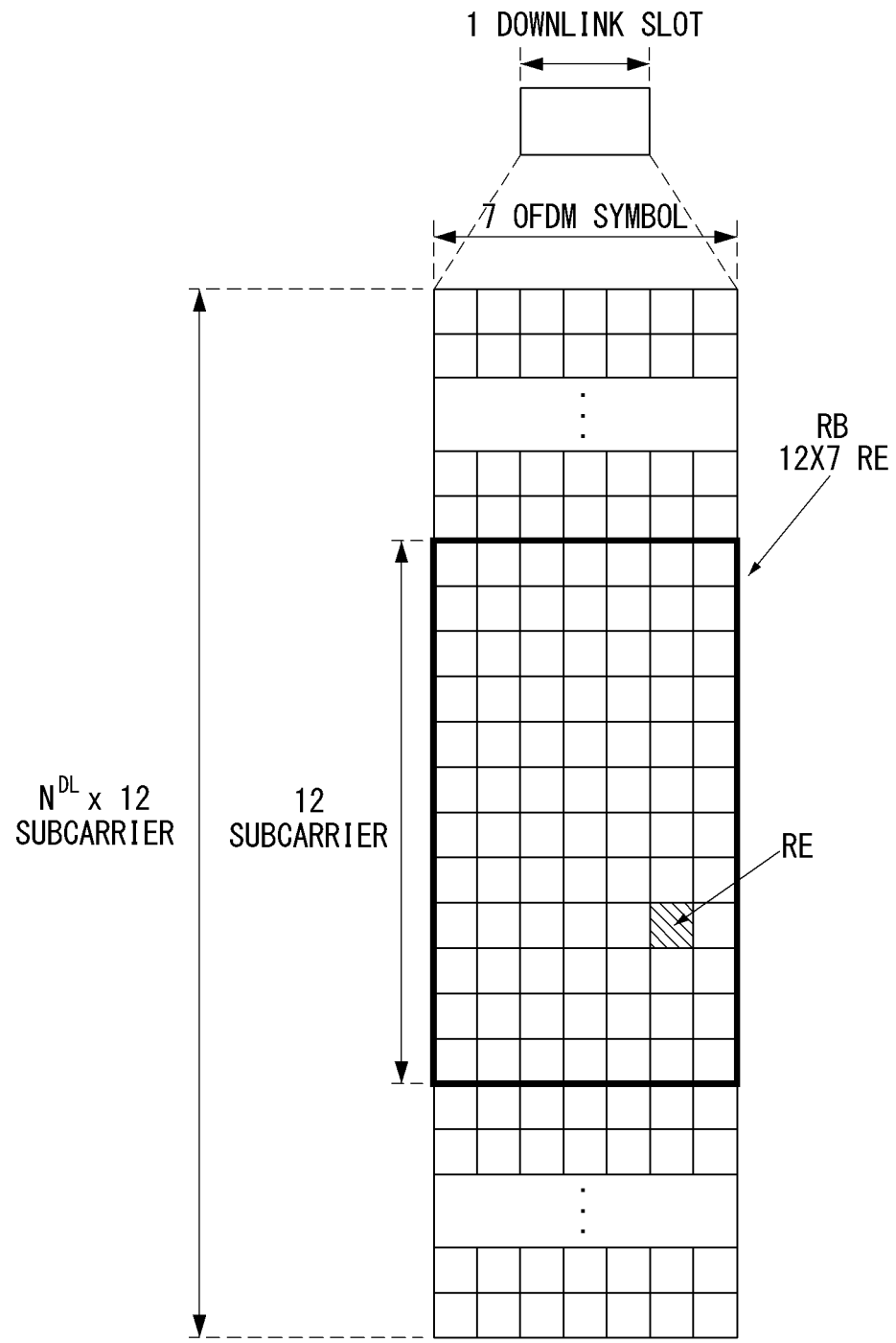

[FIG. 4]
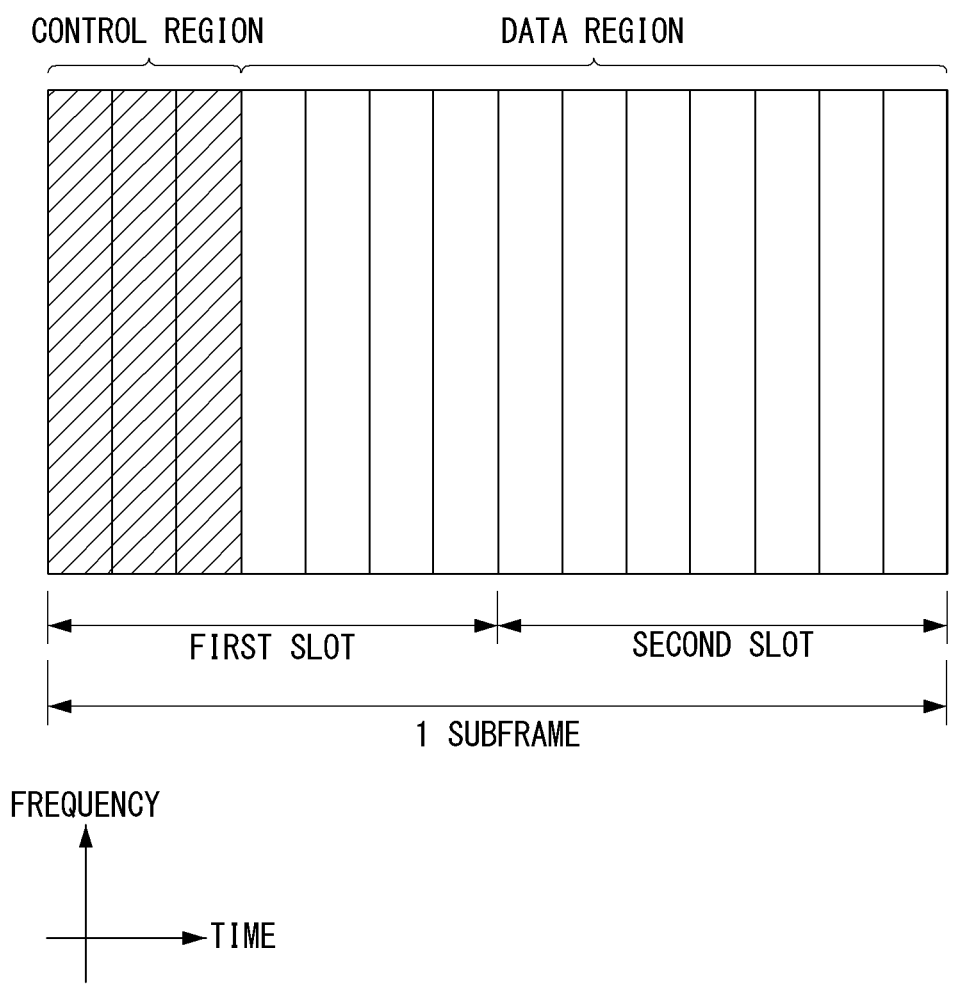

[FIG. 5]
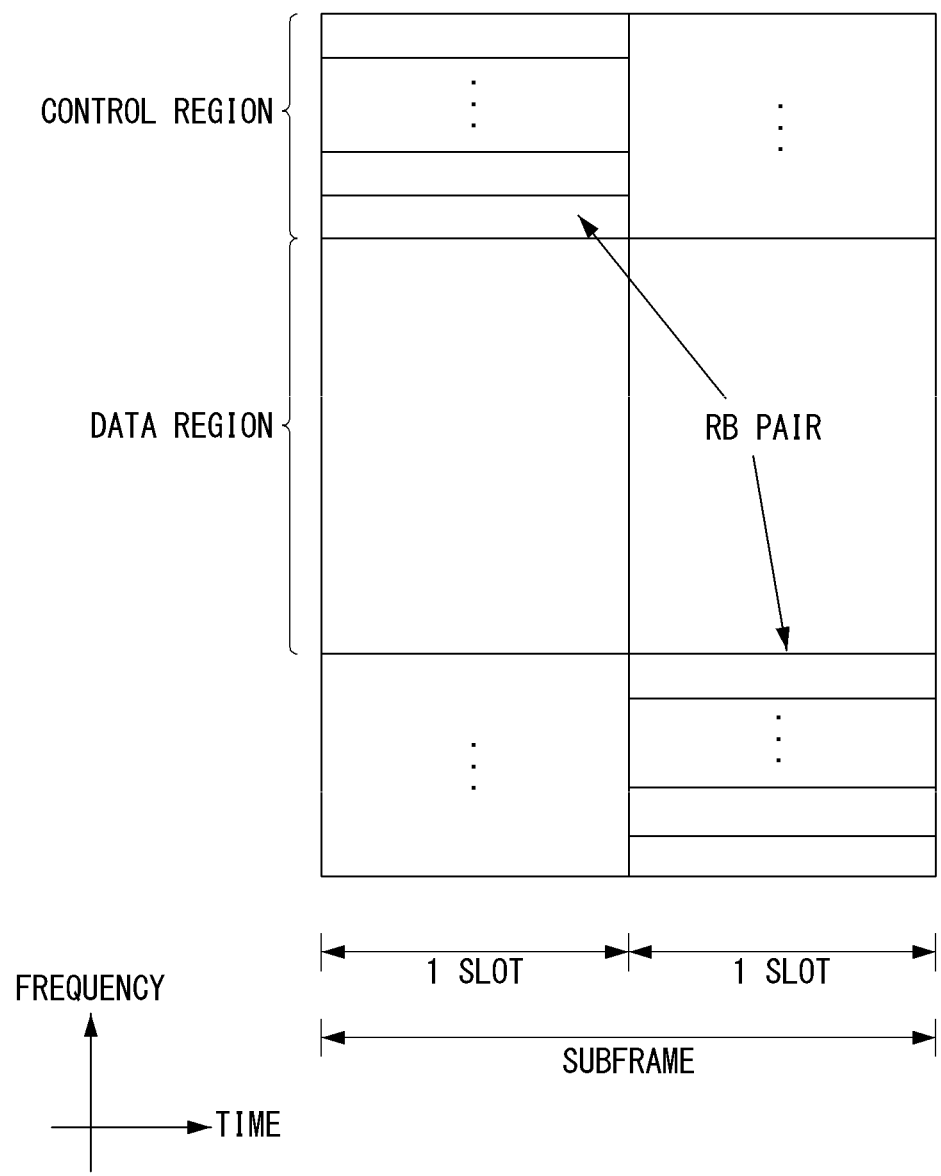

[FIG. 6]
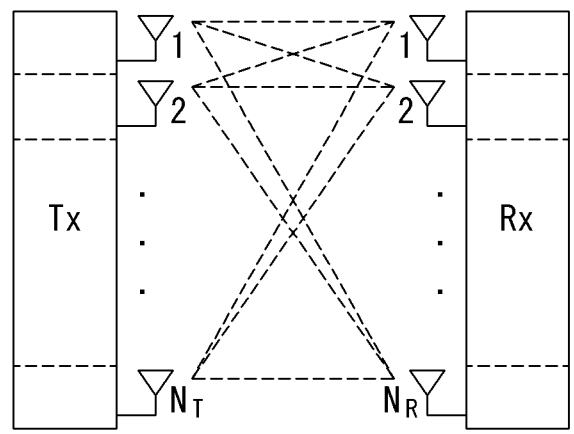
[FIG. 7]
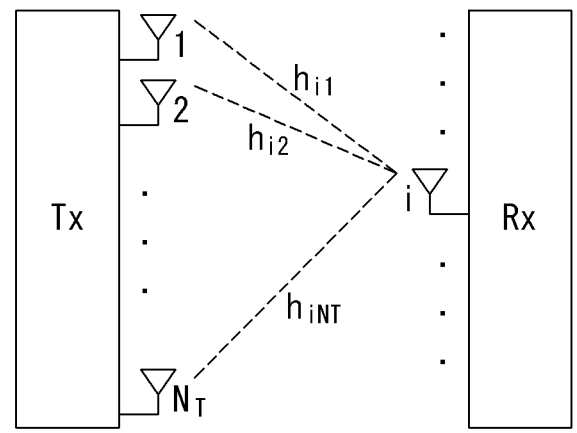

[FIG. 8]
(a)
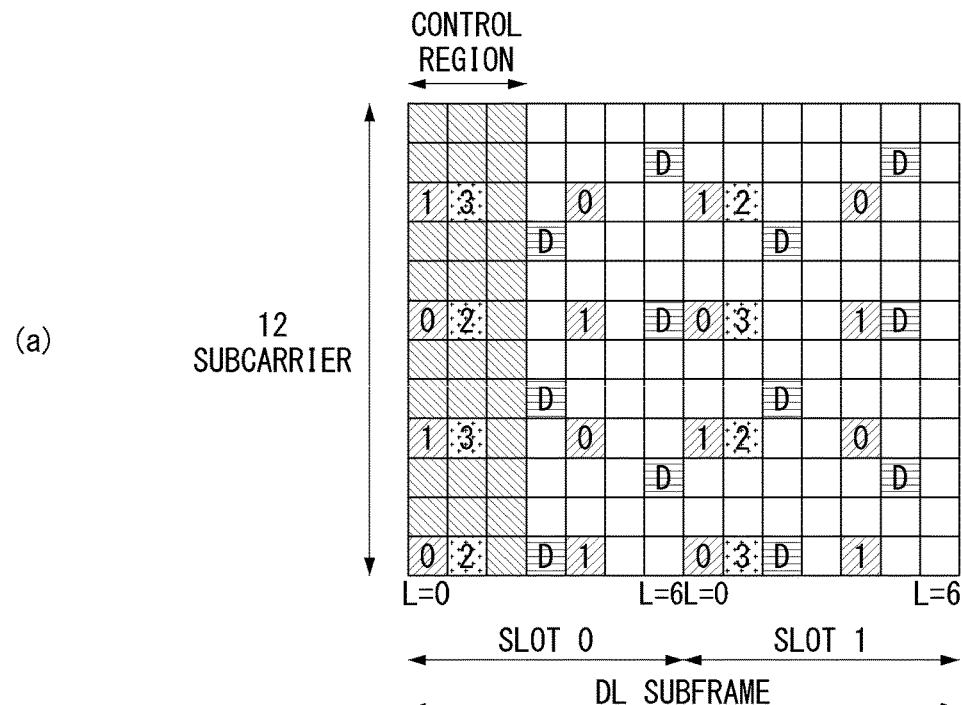
(b)
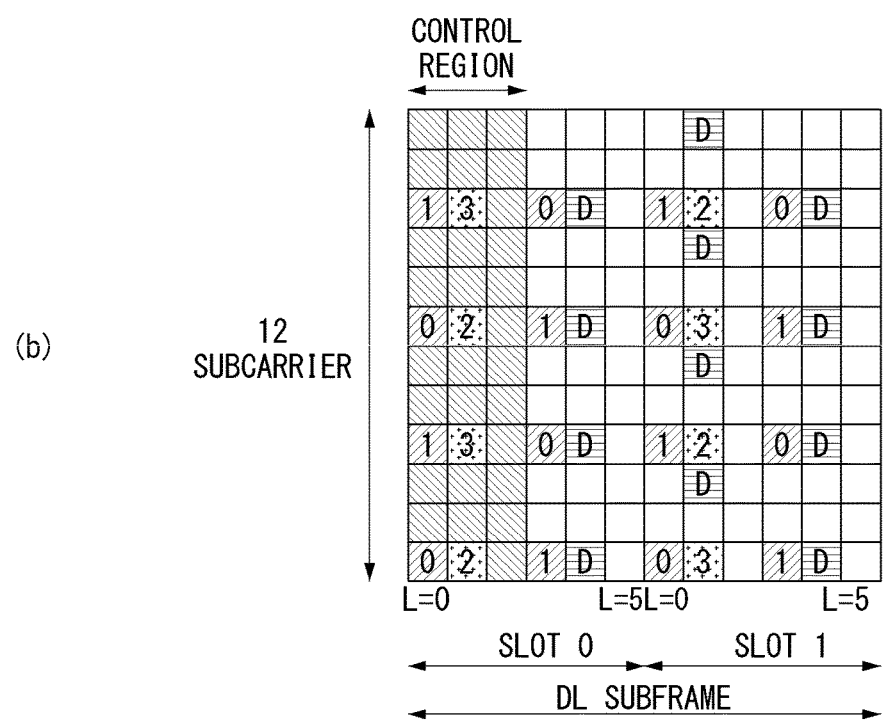

[FIG. 9]
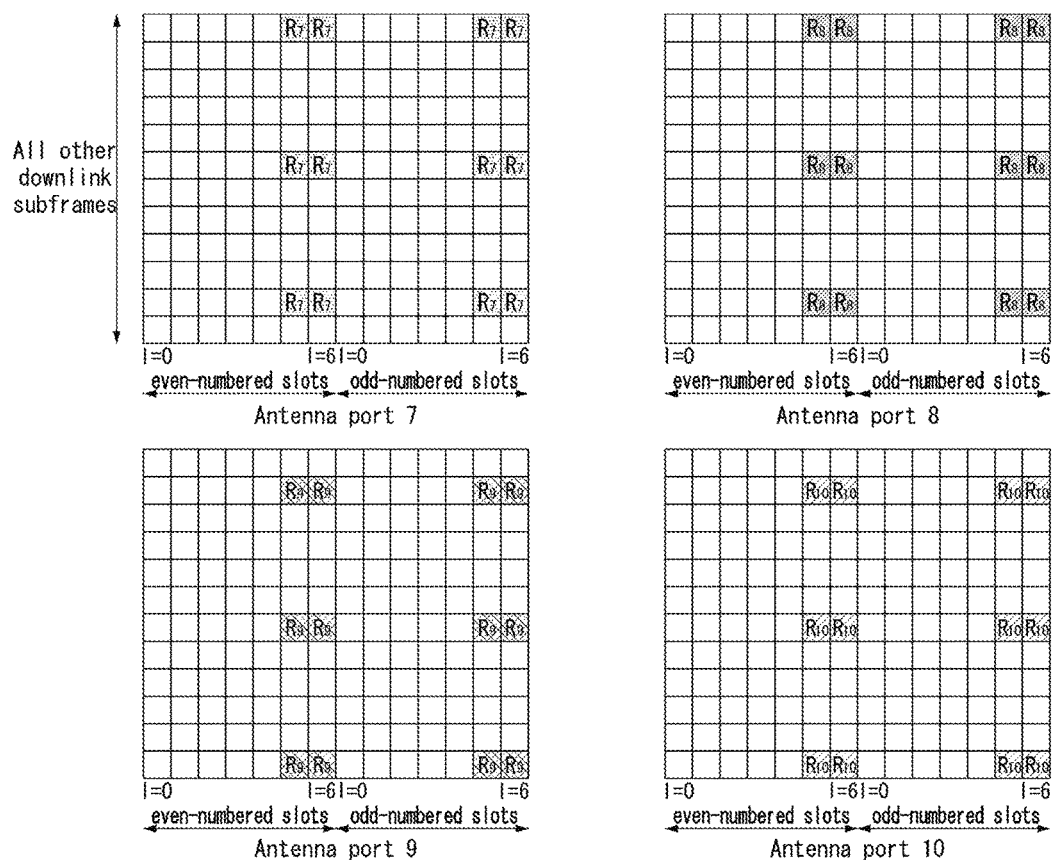

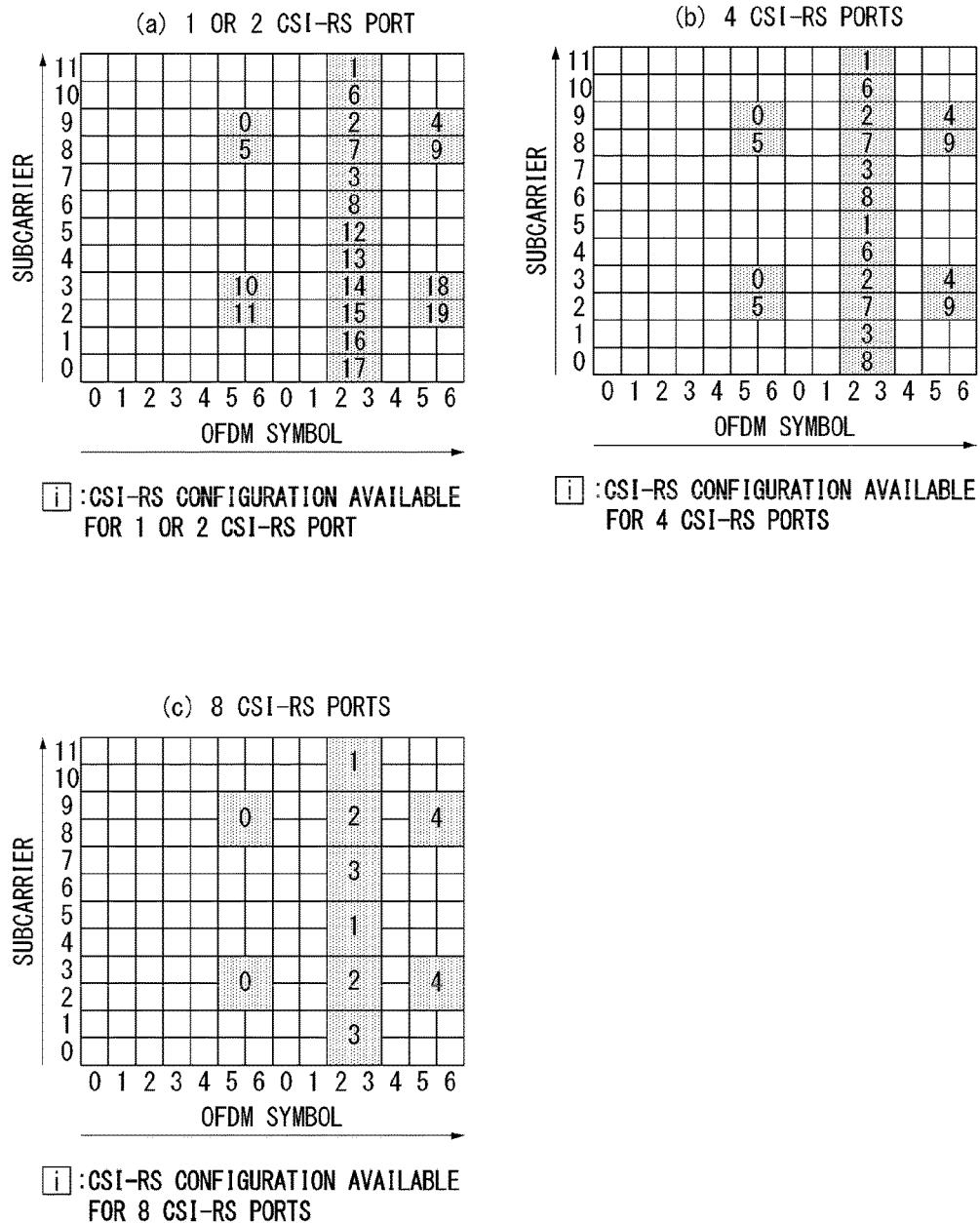
[FIG. 10]

[FIG. 11]
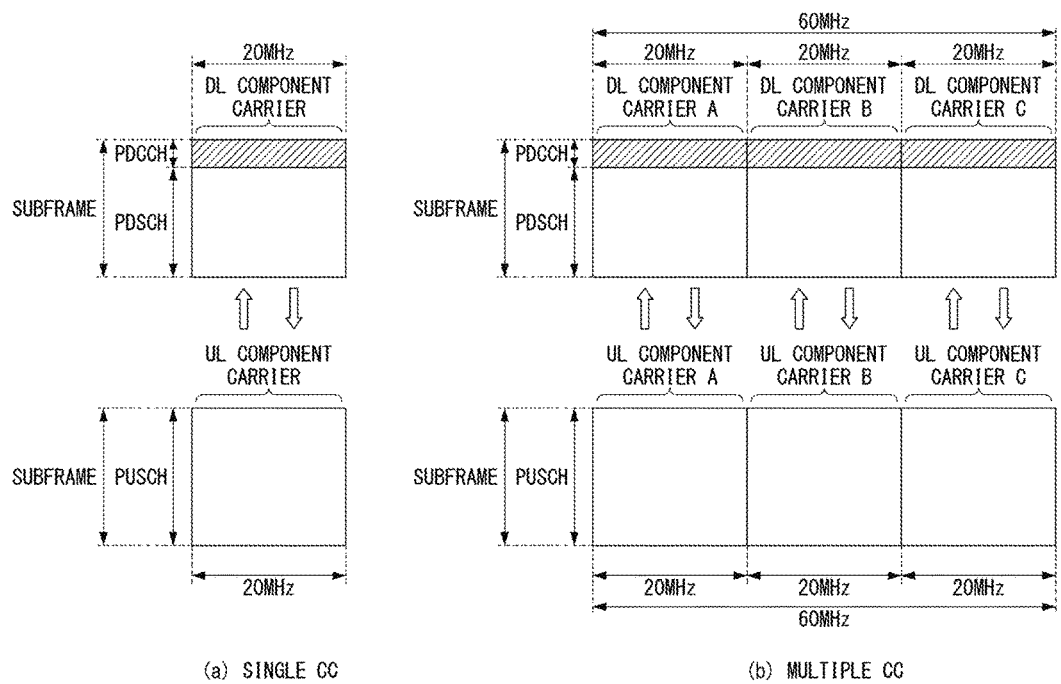
(a) SINGLE CC
(b) MULTIPLE CC

[FIG. 12]
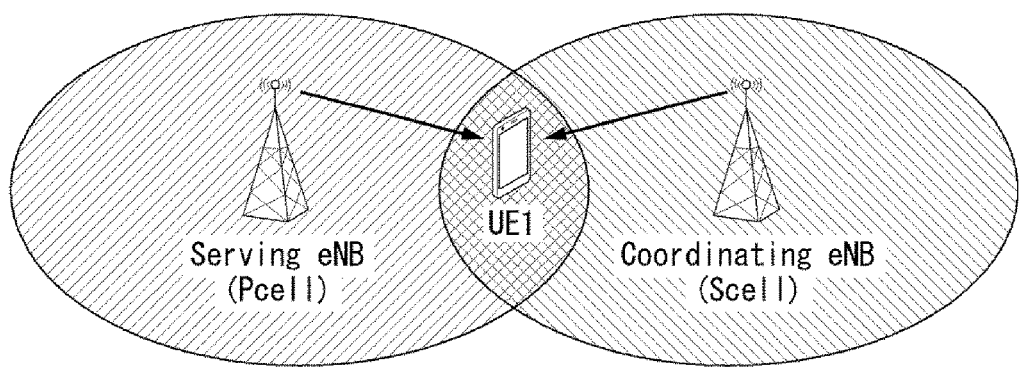
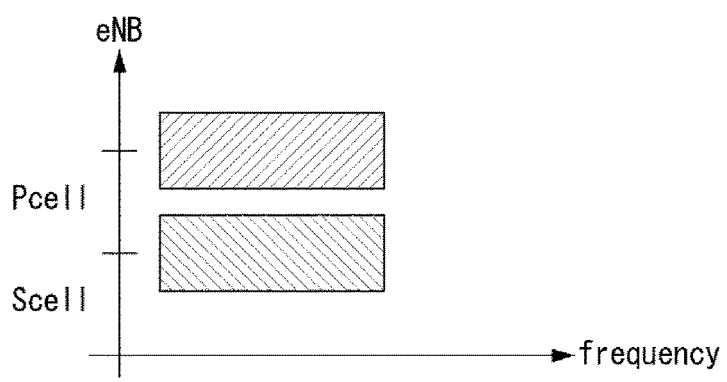

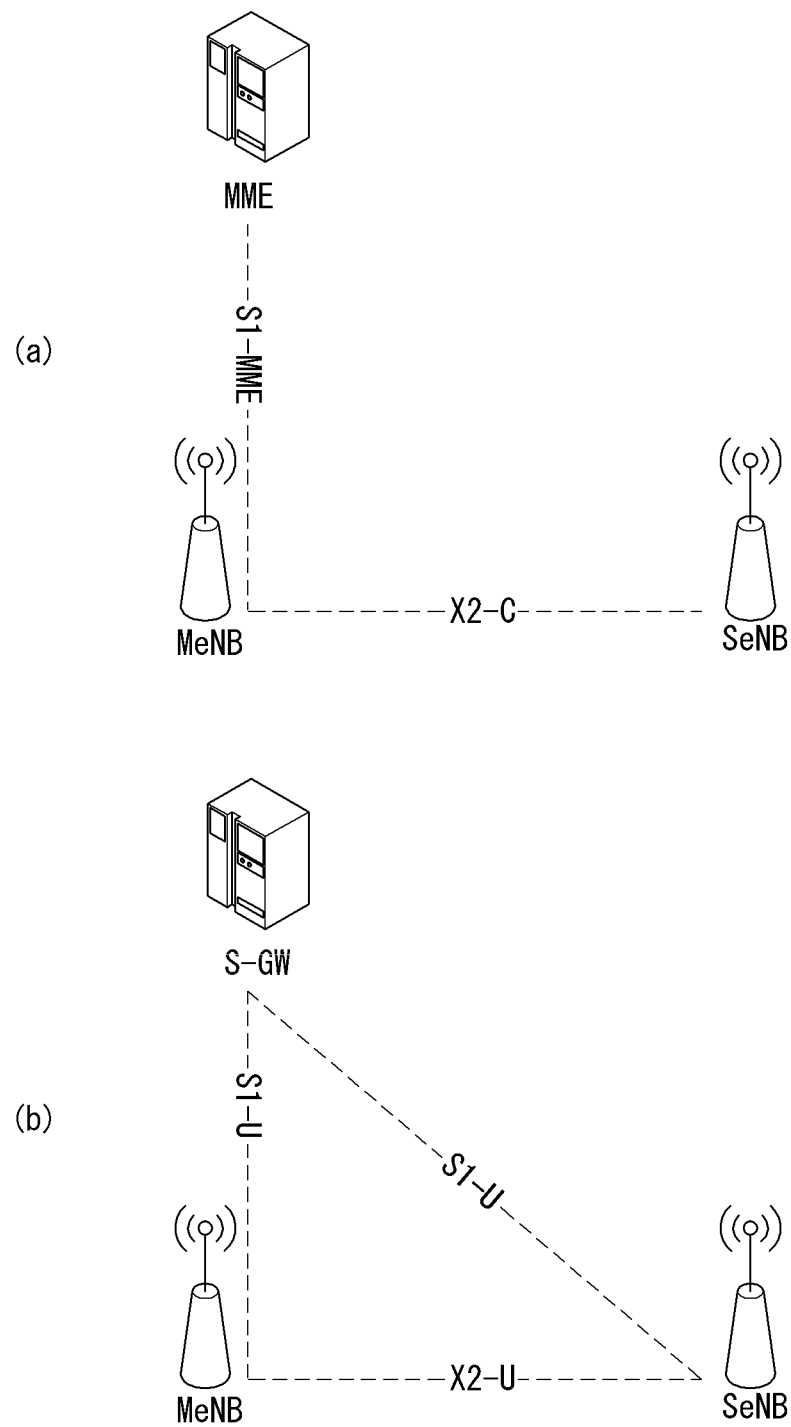
[FIG. 13]

[FIG. 14]
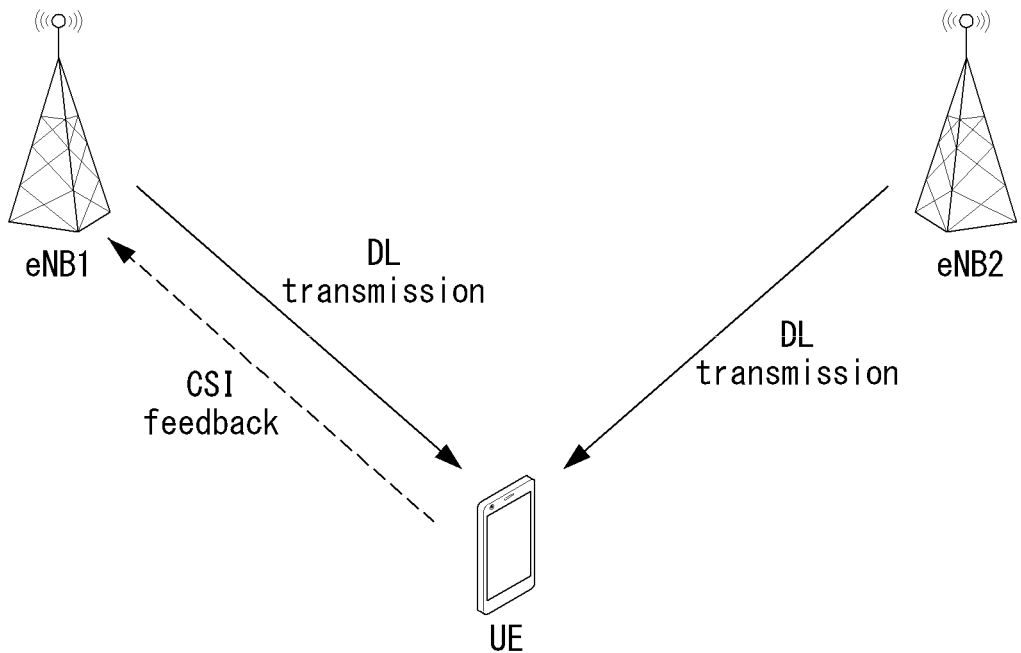
[FIG. 15]
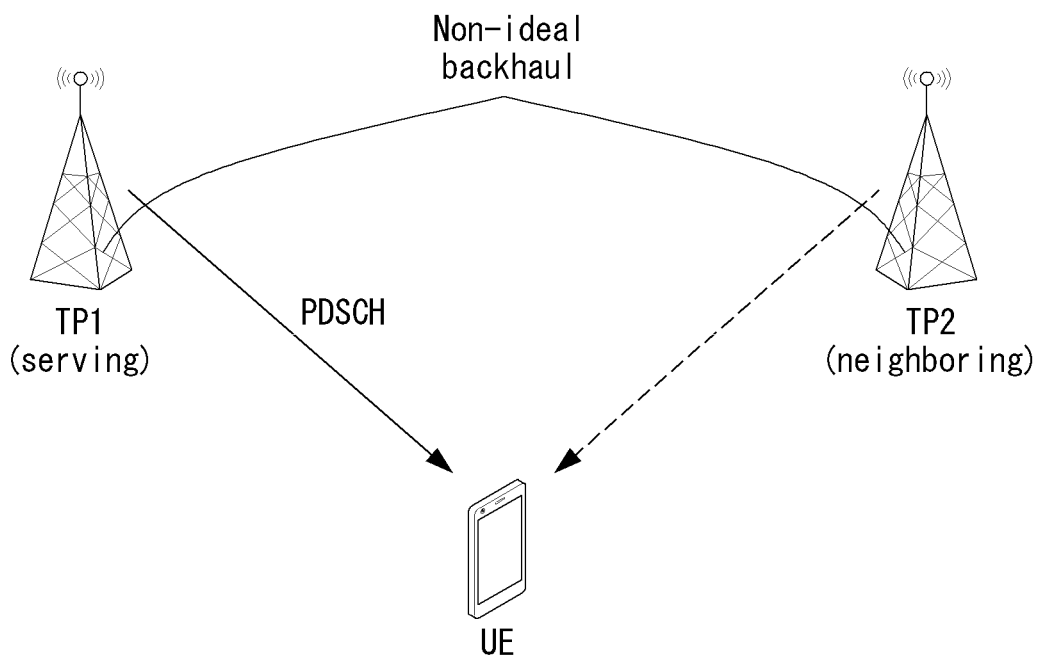

[FIG. 16]
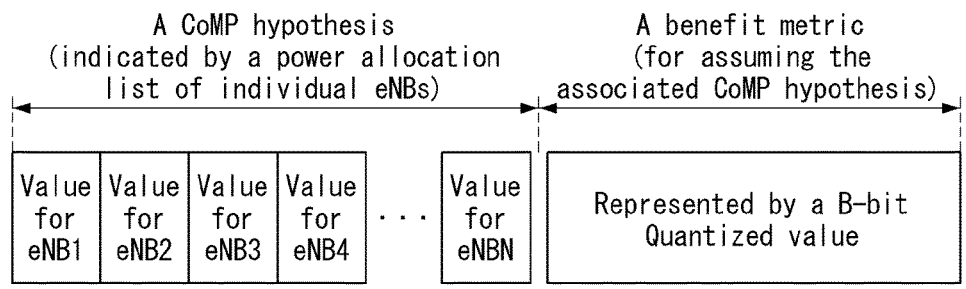
[FIG. 17]
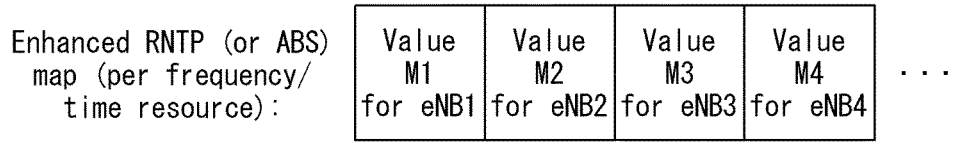

[FIG. 18]
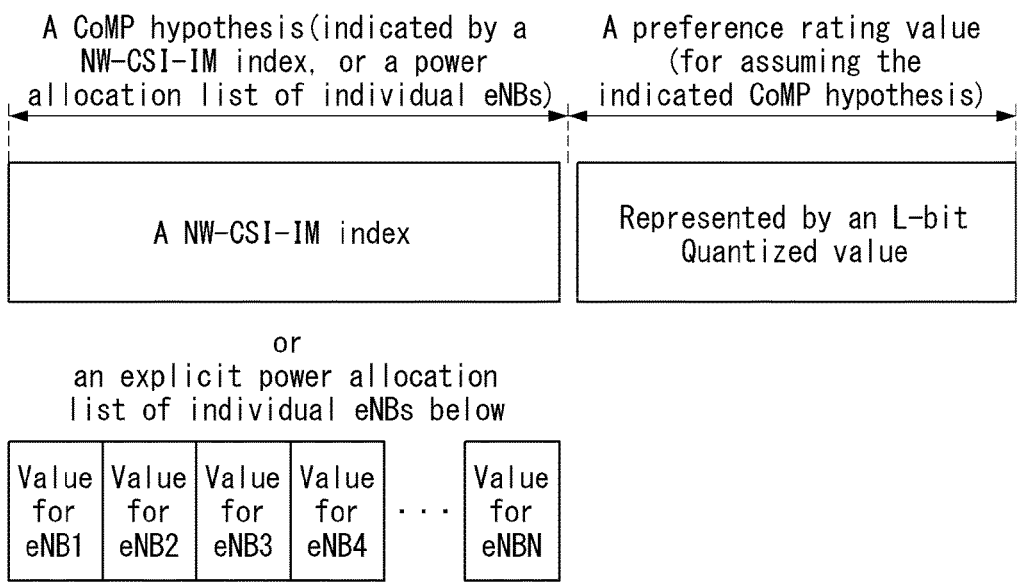
[FIG. 19]
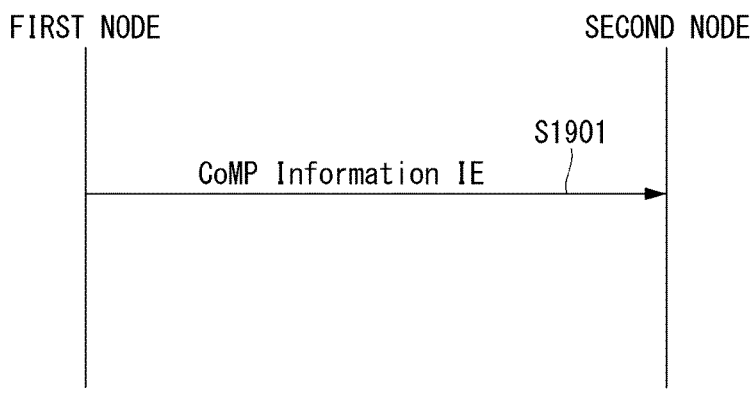

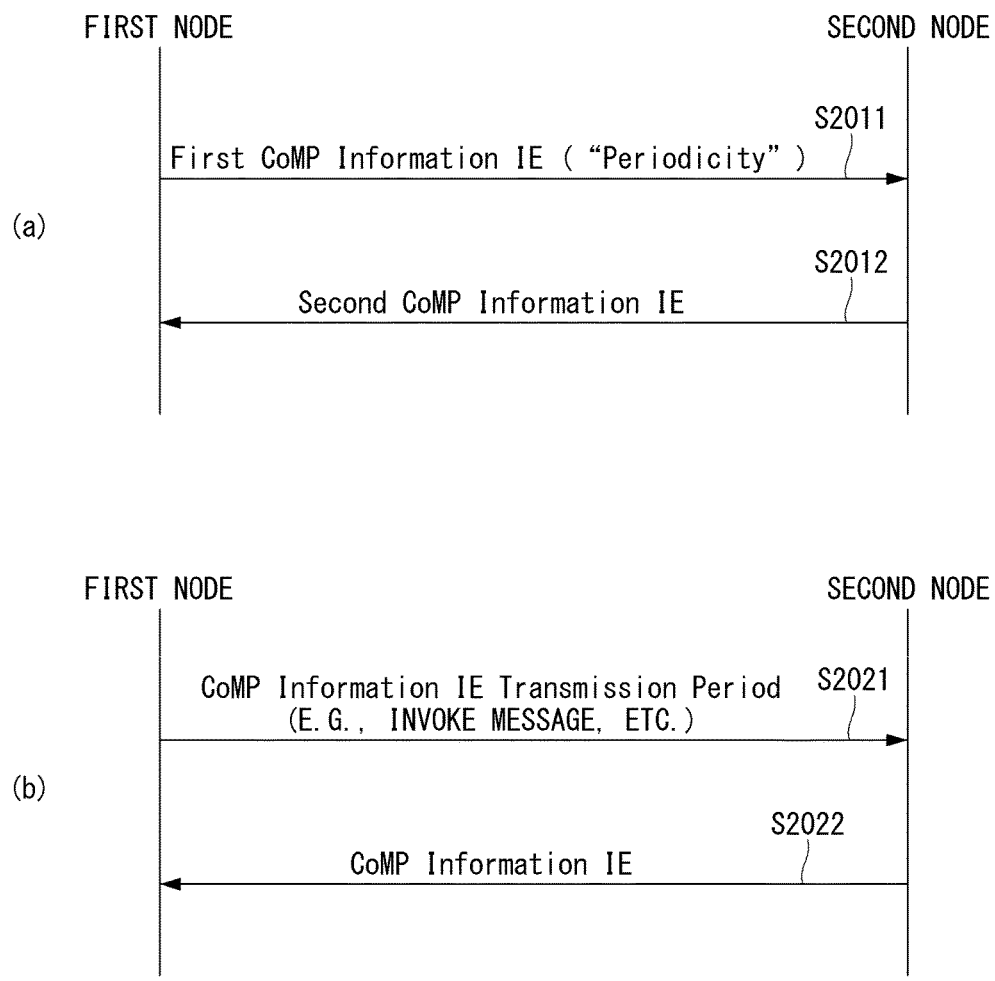

[FIG. 21]
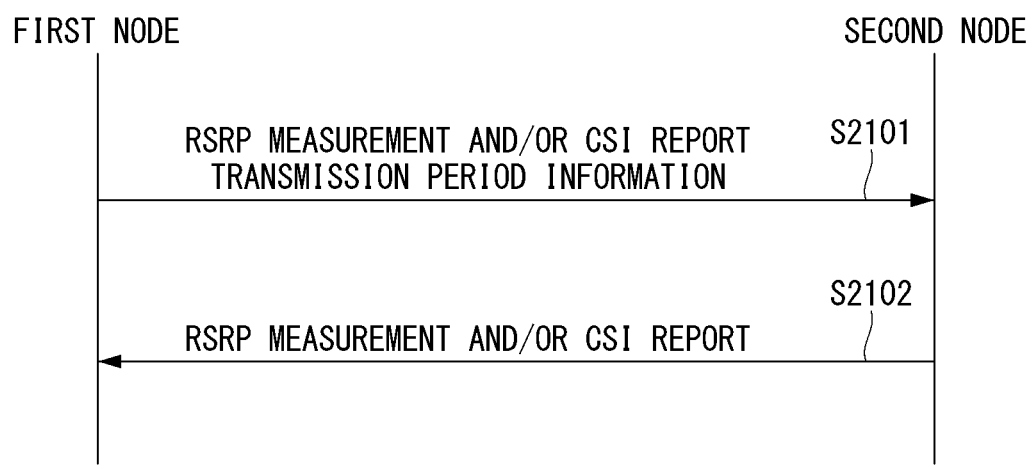

[FIG. 22]
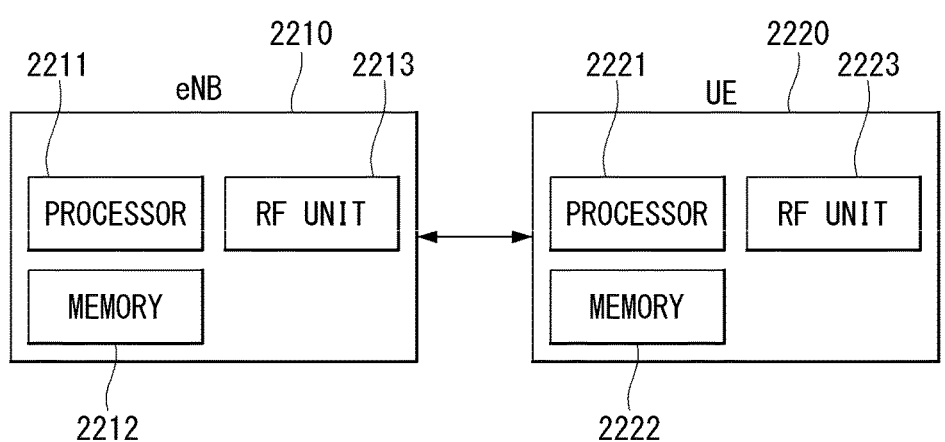

SIGNALING METHOD FOR COMP OPERATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/008030, filed on Jul. 31, 2015, which claims the benefit of U.S. Provisional Application No. 62/033,086, filed on Aug. 4, 2014, the contents of which are all hereby incorporated by reference herein in their entirety.

TECHNICAL FIELD

The present invention relates to wireless communication systems, and more particularly, to a signaling method for performing or supporting a Coordinated Multi-Point Transmission and Reception (CoMP) operation between base stations and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to propose a method for signaling between base stations in order to perform or support a CoMP operation between base stations.

In addition, particularly, another object of the present invention is to propose a method for providing resource allocation information to each member base station from a center control node in order to support a CoMP operation of centralized coordination architecture.

In addition, particularly, another object of the present invention is to propose a method for receiving CoMP information from each member base station in a center control node in order to support a CoMP operation of centralized coordination architecture.

Technical objects to be achieved by the present invention are not limited to the aforementioned objects, and those skilled in the art to which the present invention pertains may evidently understand other technical objects from the following description.

Technical Solution

According to an aspect of the present invention, a signaling method for a Coordinated Multi-Point Transmission and Reception (CoMP) operation between base stations in a wireless communication system may include transmitting, a first base station, first CoMP Information to a second base station, where the first CoMP Information may include CoMP Hypothesis Set information which is a collection of CoMP Hypothesis information for one or more cells, Benefit Metric information related to the CoMP Hypothesis Set, starting System Frame Number (SFN) information and starting Subframe Number information, where the CoMP Hypothesis is hypothetical PRB-specific resource allocation information for a cell, and where the starting SFN information may indicate a starting radio frame number of the first CoMP information, and the starting Subframe Number information may indicate the starting Subframe Number of the first CoMP information.

According to another aspect of the present invention, a first base station for performing a signaling for a Coordinated Multi-Point Transmission and Reception (CoMP) operation between base stations in a wireless communication system may include a radio frequency (RF) unit for transmitting and receiving a radio signal and a processor for controlling the base station, the processor is configured to perform: transmitting first CoMP Information to a second base station, where the first CoMP Information may include CoMP Hypothesis Set information which is a collection of CoMP Hypothesis information for one or more cells, Benefit Metric information related to the CoMP Hypothesis Set, starting System Frame Number (SFN) information and starting Subframe Number information, where the CoMP Hypothesis is hypothetical PRB-specific resource allocation information for a cell, and where the starting SFN information may indicate a starting radio frame number of the first CoMP information, and the starting Subframe Number information may indicate the starting Subframe Number of the first CoMP information.

Preferably, the starting SFN information and the starting Subframe Number information may be included in the first CoMP information only when the Benefit Metric information is a specific value.

Preferably, the CoMP information may further include periodicity information that indicates a transmission period of second CoMP information proposed by the first base station, when the second base station transmits the second CoMP information.

Preferably, the method may further include receiving, by the first base station, the second CoMP information which is transmitted on the periodicity information from the second base station.

Preferably, the periodicity information may be included in the CoMP information only when the Benefit Metric information is a specific value.

Preferably, the method may further include transmitting, by the first base station, an Invoke message to the second base station, where the Invoke message may include periodicity information that indicates a transmission period of the second CoMP information proposed by the first base station, when the second base station transmits the second CoMP information.

Preferably, the method may further include receiving, by the first base station, the second CoMP information which is transmitted on the periodicity information from the second base station.

Preferably, the CoMP Hypothesis Set may include Cell ID information and the CoMP Hypothesis information, and the CoMP Hypothesis information may include a bitmap of which position of each bit indicates each PRB with frequency-first in frequency-time resource.

Preferably, a maximum number of subframe indicated by the CoMP Hypothesis information and the benefit metric may be differently configured depending on whether the benefit metric is a specific value.

Preferably, the CoMP information may be transmitted through a Load Information message.

Technical Effects

According to the present invention, the CoMP operation between base stations may be smoothly performed or supported.

In addition, according to the present invention, the CoMP operation of centralized coordination architecture may be smoothly performed or supported.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates an example of the evolved universal terrestrial radio access network (E-UTRAN) network architecture to which the present invention may be applied.

FIG. 2 illustrates the structure of a radio frame in a wireless communication system to which the present invention may be applied.

FIG. 3 is a diagram illustrating a resource grid for a downlink slot in a wireless communication system to which the present invention may be applied.

FIG. 4 illustrates a structure of downlink subframe in a wireless communication system to which the present invention may be applied.

FIG. 5 illustrates a structure of uplink subframe in a wireless communication system to which the present invention may be applied.

FIG. 6 illustrates the configuration of a general MIMO communication system.

FIG. 7 is a diagram showing a channel from a plurality of transmission antennas to a single reception antenna.

FIG. 8 illustrates a reference signal pattern mapped to a downlink RB pair in a wireless communication system to which the present invention may be applied.

FIG. 9 is a diagram illustrating an example of a DMRS pattern in a wireless communication system to which the present invention may be applied.

FIG. 10 is a diagram illustrating the CSI-RS configuration in a wireless communication system to which the present invention may be applied.

FIG. 11 illustrates an example of a component carrier and carrier aggregation in a wireless communication system to which the present invention may be applied.

FIG. 12 is a diagram illustrating a CoMP system based on carrier aggregation in a wireless communication system to which the present invention may be applied.

FIG. 13 illustrates a network interface for Dual Connectivity in a wireless communication system to which the present invention may be applied.

FIG. 14 is a diagram illustrating an exemplary downlink CoMP operation in a wireless communication system to which the present invention may be applied.

FIG. 15 is a diagram illustrates a situation in which CoMP is not applied in a wireless communication system to which the present invention may be applied.

FIG. 16 illustrates a benefit metric signaled together with a CoMP hypothesis for a frequency/time resource map.

FIG. 17 illustrates an improved RNTP map (or improved ABS map) signaled with respect to a frequency/time resource according to an embodiment of the present invention.

FIG. 18 is a diagram for describing a benefit metric signaled together with a CoMP hypothesis for a frequency/time resource map according to an embodiment of the present invention.

FIG. 19 is a diagram illustrating a method of signaling between eNBs for supporting the CoMP operation according to an embodiment of the present invention.

FIG. 20 is a diagram illustrating a method for supporting a CoMP operation according to an embodiment of the present invention.

FIG. 21 is a diagram illustrating a signaling method between eNBs to support the CoMP operation according to an embodiment of the present invention.

FIG. 22 illustrates a block diagram of a wireless communication apparatus according to an embodiment of the present invention.

BEST MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to Which an Embodiment of the Present Invention May be Applied

FIG. 1 illustrates an example of the evolved universal terrestrial radio access network (E-UTRAN) network architecture to which the present invention may be applied.

An E-UMTS system is an evolved version of the UMTS system. For example, the E-UMTS may be also referred to as an LTE/LTE-A system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the structure of a radio frame in a wireless communication system to which the present invention may be applied.

3GPP LTE/LTE-A support a radio frame structure type 1 which may be applicable to frequency division duplex (FDD) and a radio frame structure which may be applicable to time division duplex (TDD).

In FIG. 2, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 2(a) illustrates the structure of a type 1 radio frame. The type 1 radio frame may be applied to both full duplex and half duplex FDD.

The radio frame includes 10 subframes. One radio frame includes 20 slots of $T\_slot=15360 *T\_s=0.5$ ms in length. 0 to 19 indices are assigned to the respective slots. One subframe includes consecutive 2 slots in the time domain, and a subframe i includes a slot 2i and a slot 2+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 2(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360 *T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

The structure of the radio frame according to the example of FIG. 2 is only an example. The number of subcarriers included in a radio frame or the number of slots included in a subframe and the number of OFDM symbols included in a slot may be changed in various ways.

FIG. 3 is a diagram illustrating a resource grid for a downlink slot in a wireless communication system to which the present invention may be applied.

Referring to FIG. 3, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 4 illustrates a structure of downlink subframe in a wireless communication system to which the present invention may be applied.

Referring to FIG. 4, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 5 illustrates a structure of uplink subframe in a wireless communication system to which the present invention may be applied.

Referring to FIG. 5, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 6 illustrates the configuration of a general MIMO communication system.

Referring to FIG. 6, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 6, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1, s_2, \ldots, s_{N_T}]^T \quad \text{[Equation 2]}$$

Transmission power may be different in each of pieces of transmission information $s\_1, s\_2, \ldots, s\_NT$. In this case, if pieces of transmission power are $P\_1, P\_2, \ldots, P\_NT$, transmission information having controlled transmission power may be represented using the following vector.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals $x\_1, x\_2, \ldots, x\_NT$ that are actually transmitted. In this case, the weight matrix functions to properly distribute the transmission information to antennas according to a transport channel condition. The following may be represented using the transmission signals $x\_1, x\_2, \ldots, x\_NT$.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w\_ij$ denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals $y\_1, y\_2, \ldots, y\_NR$ of the respective antennas are represented as follows using a vector y.

$$y=[y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as $h\_ij$. In this case, it is to be noted that in order of the index of $h\_ij$, the index of a reception antenna comes first and the index of a transmission antenna then comes.

Several channels may be grouped and expressed in a vector and matrix form. For example, a vector expression is described below.

FIG. 7 is a diagram showing a channel from a plurality of transmission antennas to a single reception antenna.

As shown in FIG. 7, a channel from a total of N_T transmission antennas to a reception antenna i may be represented as follows.

$$h_i^T=[h_{i1}, h_{i2}, \ldots, h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Additive white Gaussian noise (AWGN) is added to an actual channel after the actual channel experiences the channel matrix H. Accordingly, AWGN $n\_1, n\_2, \ldots, n\_NR$ added to the N_R reception antennas, respectively, are represented using a vector as follows.

$$n=[n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal (RS) in a wireless communication system may be mainly categorized into two types. In particular, there is an RS for the purpose of channel information acquisition and a reference signal used for data demodulation. Since the object of the former RS is to enable a UE to acquire channel information in downlink, the former RS should be transmitted on broadband. And, even in the case that the UE does not receive downlink data in a specific subframe, it should perform a channel measurement by receiving the corresponding RS. Moreover, the corresponding RS is also used for a measurement for mobility management of a handover, or the like. The latter RS is the RS transmitted together when a base station transmits downlink data. When a UE receives the corresponding RS, the UE may perform channel estimation, thereby demodulating data. And, the corresponding RS should be transmitted in a data transmitted region.

Five types of downlink reference signals are defined.
cell-specific reference signal (CRS)
multicast-broadcast single-frequency network reference signal (MBSFN RS)
UE-specific reference signal or demodulation reference signal (DM-RS)
positioning reference signal (PRS)
channel state information reference signal (CSI-RS)

For each downlink antenna port, a single reference signal is transmitted.

The CRS is transmitted in all downlink subframes in a cell that supports a PDSCH transmission. The CRS is transmitted on one or more of antenna ports 0 to 3. The CRS is defined only in $\Delta f=15$ kHz.

The MBSFN RS is transmitted in an MBSFN region of an MBSFN subframe only when a Physical Multicast Channel (PMCH) is transmitted. The MBSFN RS is transmitted on antenna port 4. The MBSFN RS is defined only in the extended CP.

The DM-RS is supported for transmitting a PDSCH, and transmitted on antenna port p=5, p=7, p=8 or p=7, 8, ..., υ+6. Here, υ is the number of layer used for transmitting a PDSCH. The DM-RS is existed for a PDSCH demodulation and valid only in the case that a PDSCH transmission is linked in the corresponding antenna port. The DM-RS is transmitted only in the resource block (RB) to which the corresponding PDSCH is mapped.

When any one of a physical channel or a physical signal except the DM-RS is transmitted using the RE of an index pair (k, l) which is the same as the resource element (RE) in which the DM-RS is transmitted regardless of an antenna port (p), the DM-RS is not transmitted in the RE of the corresponding index pair (k, l).

The PRS is transmitted only in the resource block in the downlink subframe which is configured for the PRS transmission.

When both of a normal subframe and an MBSFN subframe are configured as positioning subframes in a cell, the OFDM symbols in the MBSFN subframe which is configured for the PRS transmission use the same CP as subframe #0. When only the MBSFN subframe is configured as positioning subframes in a cell, the OFDM symbols configured for the PRS in the MBSFN region of the corresponding subframe uses the extended CP.

In the subframe configured for the PRS transmission, the starting point of the OFDM symbol configured for the PRS transmission is the same as the starting point of the subframe in which all OFDM symbols have the same CP length as the OFDM symbol configured for the PRS transmission.

The PRS is transmitted on antenna port 6.

The PRS is not mapped to the Physical Broadcast Channel (PBCH) and the RE (k, l) which is allocated to a RSS or an SSS regardless of the antenna port (p).

The PRS is defined only in $\Delta f=15$ kHz.

The CSI-RS is transmitted in 1, 2, 4 or 8 antenna ports using p=15, p=15, 16, p=15, ..., 18 and p=15, ..., 22, respectively.

The CSI-RS is defined only in $\Delta f=15$ kHz.

The reference signal will be described in more detail.

The CSI is a reference signal designed for the information acquisition of channel state shared by all UEs, the measurement of handover, and so on. The DM-RS is used for data demodulation only for a specific UE. By using such reference signals, the information for demodulation and channel measurement may be provided. That is, the DM-RS is used only for the data demodulation, and the CRS is used for both of the channel information acquisition and the data demodulation.

A receiver (i.e., UE) measures a channel state from the CRS, and feedbacks an indicator related to channel quality such as a Channel Quality Indicator (CQI), a Precoding Matrix Indicator (PMI) and/or a Rank Indicator (RI) to a transmitter (i.e., BS). The CRS is also called a cell-specific RS. On the other hand, the reference signal related to the feedback of Channel State Information (CSI) may be defined as CSI-RS.

The DM-RS may be transmitted through REs when the data demodulation on a PDSCH is required. A UE may receive the fact whether the DM-RS is existed through a high layer, which is valid only when a corresponding PDSCH is mapped. The DM-RS may also be called a UE-specific RS or a Demodulation RS (DMRS).

FIG. 8 illustrates a reference signal pattern mapped to a downlink RB pair in a wireless communication system to which the present invention may be applied.

Referring to FIG. 8, a downlink RB pair may be represented by a subframe in time domain X 12 subcarriers in frequency domain as a unit of the reference signal being mapped. That is, a RB pair on the time axis (x-axis) has 14 OFDM symbol lengths (in the case of FIG. 8(a)) in the case of the normal Cyclic Prefix (CP) and has 12 OFDM symbol lengths (in the case of FIG. 8(b)) in the case of the extended Cyclic Prefix (CP). The resource elements (REs) denoted by '0', '1', '2' and '3' in the RB lattice mean the positions of CRSs of antenna port indices '0', '1', '2' and '3', respectively. The REs denoted by 'D' means the position of DM-RS.

LTE-A, which is an evolution version of LTE, should be designed to support up to 8 transmission antennas on DL. Accordingly, RSs for up to 8 transmission antennas should also be supported in LTE-A. In LTE, DL RSs are defined only for up to 4 antenna ports. Therefore, in the case that a BS has 4 to 8 DL transmission antennas in LTE-A, RSs for these antenna ports need to be additionally defined and designed. For the RSs for up to 8 transmission antenna ports, both the RS for channel measurement and the RS for data demodulation need to be designed.

One of the important considerations in designing an LTE-A system is the backward compatibility, that is, an LTE UE should be normally operates in the LTE-A system and a system should also support the LTE UE. In terms of RS transmission, in time-frequency region in which a CRS defined in the LTE standard is transmitted in every subframe over the full band, the RSs for up to 8 transmission antennas should be additionally defined. When the RSs for up to 8 transmission antennas is added in every subframe over the full band in the same way of the existing LTE CRS in the LTE-A system, an RS overhead excessively increases.

Accordingly, new RSs introduced in the LTE-A system may be classified into two types. One is a channel state information/indication-RS (CSI-RS) intended for channel measurement for selecting a modulation and coding scheme (MCS), a PMI, and the like, and the other is a data demodulation-RS (DMRS) intended for demodulation of data transmitted through up to 8 transmission antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

FIG. 9 is a diagram illustrating an example of a DMRS pattern in a wireless communication system to which the present invention may be applied.

FIG. 9 shows a position of a resource element to which a DMRS is transmitted on one resource block pair (in case of a normal CP, 14 OFDM symbols in time domain X 12 subcarriers in frequency domain) in which DL data is transmitted.

Although the DMRS is defined for a single layer transmission of antenna port 5 initially, the DMRS may be transmitted in response to 4 antenna ports (antenna port indices 7, 8, 9 and 10) additionally defined in the LTE-A system for the spatial multiplexing of up to 8 layers later. The DMRS for antenna ports different from each other may be distinguished from each other in a manner of being positioned at different frequency resources (subcarriers) and/or different time resources (OFDM symbols) (i.e., the DMRS may be multiplexed by FDM and/or TDM scheme). In addition, the DMRS for antenna ports different from each other positioned at an identical time-frequency resource may be distinguished from each other by an orthogonal code (i.e., the DMRS may be multiplexed by CDM scheme).

In the example of FIG. 7, the DMRSs for antenna ports 7 and 8 may be mapped to the same RE, and may be multiplexed by an orthogonal code. Similarly, the DMRSs for antenna ports 9 and 10 may be mapped to the same RE, and may be multiplexed by the orthogonal code.

When a BS transmits a DMRS, precoding applied to data is applied to the DMRS. Accordingly, the channel information estimated by the UE using the DMRS (or UE-specific RS) is precoded channel information. The UE may easily perform data demodulation using the precoded channel information estimated through the DMRS. However, the UE does not know the information about the precoding applied to the DMRS, and accordingly the UE may not acquire, from the DMRS, channel information that is not precoded. The UE may acquire the channel information that is not precoded, using an RS separate from the DMRS, namely using the CSI-RS mentioned above.

In the LTE-A system, an eNB should transmit the CSI-RSs for all antenna ports. Since there is a problem that an overhead is too great to transmit the CSI-RS for up to 8 transmission antenna ports in every subframe, the overhead may be decreased by intermittently transmitting the CSI-RS on time axis, not by transmitting it in every subframe. That is, the CSI-RS may be transmitted periodically with a period of an integer multiple of a subframe or transmitted with a specific transmission pattern. In this case, the period or pattern in which the CSI-RS is transmitted may be configured by the eNB.

In order to measure the CSI-RS, a UE should know the transmission subframe index of the CSI-RS, the time-frequency position of the CSI-RS resource element (RE) in the transmission subframe, the information of a CSI-RS sequence, etc for each CSI-RS antenna port of the cell belonged to the UE itself.

In the LTE-A system, an eNB should transmit the CSI-RSs for each of up to 8 antenna ports. The resource used for the CSI-RS transmission in different antenna ports should be orthogonal. When an eNB transmits a CSI-RS for different antenna ports, by mapping the CSI-RSs for each of the antenna ports to different REs, the eNB may orthogonally allocate these resources in the FDM/TDM scheme. Otherwise, the eNB may transmit the CSI-RS for different antenna ports in the CDM scheme that maps the CSI-RS to mutually orthogonal codes.

When an eNB indicates the information of a CSI-RS to the UE of its own cell, the eNB should indicate the information of time-frequency to which the CSI-RS for each antenna port is mapped. Particularly, the information includes subframe numbers in which the CSI-RS is transmitted, a period on which the CSI-RS is transmitted, a subframe offset in which the CSI-RS is transmitted, an OFDM symbol number in which the CSI-RS RE of a specific antenna is transmitted, frequency spacing, an offset or shift value of RE on frequency axis, and the like.

Generally, as a scheme for an eNB to notify the CSI-RS configuration, the following two schemes are considered.

First, a first scheme that uses a Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, the second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

CSI-RS Definition

In the case of a UE to which transmission mode 9 is configured for a serving cell, a single CSI-RS resource may be configured to the UE. In the case of a UE to which transmission mode 10 is configured for a serving cell, one or more CSI-RS resources may be configured to the UE.

For each CSI-RS resource configuration, the following parameters may be configured through high layer signaling.

In the case that transmission mode 10 is configured, the CSI-RS resource configuration identifier The number of CSI-RS ports The CSI-RS configuration The CSI-RS subframe configuration ($I_{CSI\text{-}RS}$)

In the case that transmission mode 9 is configured, the transmission power ($P_C$) for the CSI feedback In the case that transmission mode 10 is configured, the transmission power ($P_C$) for the CSI feedback with respect to each CSI process. When the CSI subframe sets $C_{CSI,0}$ and $C_{CSI,1}$ are configured by a high layer for the CSI process, $P_C$ is configured for each CSI subframe set of the CSI process.

The pseudo-random sequence generator parameter ($n_{ID}$)

In the case that transmission mode 10 is configured, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfigList-r11) parameter.

In the same subframe of a serving cell, the CSI-RS and the PMCH are not configured together.

When four CRS antenna ports are configured in frame structure type 2, the CSI-RS configuration index belonged to [20-31] set in the case of the normal CP or [16-27] set in the case of the extended CP is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

CSI-Interference Measurement (CSI-IM) Resource

For the UE to which transmission mode 10 is configured, one or more Channel-State Information—Interference Measurement (CSI-IM) resource configuration may be configured.

The following parameters may be configured for each CSI-IM resource configuration through high layer signaling.

The ZP CSI-RS configuration

The ZP CSI-RS subframe configuration ($I_{CSI\text{-}RS}$)

The CSI-IM resource configuration is the same as one of ZP CSI-RS resource configurations that may be configured to a UE.

In the same subframe in a serving cell, the CSI-IM resource and the PMCH are not configured simultaneously.

Definition of Zero Power (ZP) CSI-RS

For the UE to which transmission modes 1 to 9 are configured, a ZP CSI-RS resource configuration may be configured to the UE for the serving cell. For the UE to which transmission mode 10 is configured, one or more ZP CSI-RS resource configurations may be configured to the UE for the serving cell.

The following parameters may be configured for the ZP CSI-RS resource configuration through high layer signaling.

The ZP CSI-RS configuration list (16 bits bitmap 'Zero-PowerCSI-RS')

The ZP CSI-RS subframe configuration ($I_{CSI-RS}$)

In the same subframe in a serving cell, the ZP CSI-RS resource and the PMCH are not configured simultaneously.

For the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighboring cells may have different configurations to the maximum. In addition, the CSI-RS configuration may be divided into the case of being applied to both the FDD frame and the TDD frame and the case of being applied to only the TDD frame.

A subcarrier and a slot number are determined according to the CSI-RS configuration, and based on it, the time-frequency resource (i.e., subcarrier and OFDM symbol) that each CSI-RS antenna port uses for transmitting the CSI-RS is determined.

A plurality of CSI-RS configurations may be used in a cell. 0 or 1 CSI-RS configuration may be used for the non-zero power (NZP) CSI-RS, and 0 or several CSI-RS configurations may be used for the zero power CSI-RS.

A UE assumes the zero power transmission for the REs (except the case of being overlapped with the RE that presumes the NZP CSI-RS that is configured by a high layer) according to the CSI-RS configuration indicated by the corresponding bit, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15, 16}, S={17, 18}, S={19, 20} or S={21, 22}) is transmitted is not used for transmitting the PDSCH or the CSI-RS of another antenna port.

FIG. 10 is a diagram illustrating a CSI-RS configuration in a wireless communication system to which the present invention may be applied.

FIG. 10(a) shows 20 CSI-RS configurations that are available in the CSI-RS transmission through 1 or 2 CSI-RS antenna ports, and FIG. 10(b) shows 10 CSI-RS configurations that are available by 4 CSI-RS antenna ports. FIG. 10(c) shows 5 CSI-RS configurations that are available in the CSI-RS transmission through 8 CSI-RS antenna ports.

As such, according to each CSI-RS configuration, the radio resource (i.e., subcarrier and symbol) in which the CSI-RS is transmitted is determined.

When 1 or 2 CSI-RS antenna ports are configured for transmitting the CSI-RS for a specific cell, the CSI-RS is transmitted on the radio resource according to the configured CSI-RS configuration among 20 CSI-RS configurations shown in FIG. 10(a).

Similarly, when 4 CSI-RS antenna ports are configured for transmitting the CSI-RS for a specific cell, the CSI-RS is transmitted on the radio resource according to the configured CSI-RS configuration among 10 CSI-RS configurations shown in FIG. 10(b). In addition, when 8 CSI-RS antenna ports are configured for transmitting the CSI-RS for a specific cell, the CSI-RS is transmitted on the radio resource according to the configured CSI-RS configuration among 5 CSI-RS configurations shown in FIG. 10(c).

The CSI-RS for each of the antenna ports is transmitted with being CDM to the same radio resource for each of two antenna ports (i.e., {15, 16}, {17, 18}, {19, 20}, {21, 22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1 ] is multiplied, and [1, −1] is multiplied to the complex symbol of the CSI-RS for antenna port 16, and the complex symbols are mapped to the same radio resource. This procedure is the same for antenna ports {17, 18}, {19, 20 } and {21, 22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 10(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for 8 antenna ports includes all of the radio resource for 4 antenna ports and 2 or 3 antenna ports.

The RS patterns shown in FIG. 8 to FIG. 10 are just examples, and various embodiment of the present invention is not limited to the specific RS pattern. But the various embodiment of the present invention may be identically applied to the case that different RS patterns are defined and used.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 2 below.

Table 2 exemplifies the configuration ($I_{CSI-RS}$) of CSI-RS subframe.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |

TABLE 2-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS} - 35$ |
| 75-154 | 80 | $I_{CSI-RS} - 75$ |

Referring to Table 2, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration ($I_{CSI-RS}$) may be configured by a high layer signaling (e.g., RRC signaling). The CSI-RS subframe configuration ($I_{CSI-RS}$) may be separately configured from the NZP CSI-RS and the ZP CSI-RS.

The subframe including the CSI-RS satisfies Equation 12 below.

$$(10n_f + \lfloor n_s/2 \rfloor - \Delta_{CSI-RS}) \bmod T_{CSI-RS} = 0 \quad [\text{Equation 12}]$$

In Equation 12, $T_{CSI-RS}$ represents the CSI-RS transmission period, $\Delta_{CSI-RS}$ represents the subframe offset value, $n_f$ represents the system frame number, and $n_s$ represents the slot number.

Channel State Information (CSI) Feedback

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO transmission antennas. To allow the receiver (e.g., a UE) to feed back CSI, the transmitter (e.g., an eNB) may allocate a UL control channel or a UL-SCH to the receiver.

The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since rank is determined mainly according to long-term fading of a channel, the RI may be fed back with a longer periodicity (namely, less frequently) than the PMI and the CQI. In the case of transmission diversity, the RI is the same as 1.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back.

The CQI is information indicating channel quality or channel strength. The CQI may be expressed as a predetermined MCS combination. That is, a CQI index that is fed back indicates a corresponding modulation scheme and code rate. Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs. One (a first PMI) of the two PMIs has an attribute of long term and/or wideband, and may be referred to as W1. Another (a second PMI) of the two PMIs has an attribute of short term and/or subband, and may be referred to as W2. Final PMI may be determined by the combination (or function) of W1 and W2. For example, when the final PMI is W, it may be defined that W=W1×W2 or W=W2×W1.

In this case, the average characteristics of a channel in terms of the frequency and/or time are reflected in W1. In other words, W1 may be defined as CSI in which the characteristics of a long term channel in terms of time are reflected, the characteristics of a wideband channel in terms of frequency are reflected, or the characteristics of a long term channel in terms of time and a wideband channel in terms of frequency are incorporated. In order to simply represent such characteristics of W1, W1 is called CSI of long term-wideband attributes (or a long term wideband PMI).

Meanwhile, a channel characteristic that is instantaneous compared to W1 is reflected in W2. In other words, W2 may be defined as CSI in which the characteristics of a short term channel in terms of time are reflected, the characteristics of a sub-band channel in terms of frequency are reflected, or the characteristics of a short term channel in terms of time and a sub-band channel in terms of frequency are reflected. In order to simply represent such characteristics of W2, W2 is called CSI of a short term-sub-band attributes (or a short term sub-band PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

In the case that such a codebook is used, channel feedback of higher accuracy compared to a case where a single codebook is used is made possible. A single cell MU-MIMO and/or multi-cell cooperation communication may be supported using channel feedback of higher accuracy as described above.

Such a CSI reporting method is divided into a periodic reporting which is periodically transmitted and an aperiodic reporting which is transmitted by a request of a BS.

The aperiodic reporting is configured to each UE by a CSI request field of 1 or 2 bits included in an UL scheduling grant (e.g., DCI format 0 or 4) that a BS forwards to the UE. When each UE receives the information, the UE may forward the CSI to the BS through a PUSCH by considering its own transmission mode.

In the case of periodic reporting, through high layer signaling (e.g., RRC signaling), a CSI report period, an offset on the corresponding period, and the like are signaled to a UE in the unit of subframe, and each UE may forward the CSI to a BS by considering a transmission mode according to a predetermined period through a PUCCH.

In the case that one or more serving cell is configured to a UE, the UE transmits the CSI only to an activated serving cell. In the case that the UE is not configured to transmit a PUSCH and a PUCCH simultaneously, the UE transmits the periodic CSI reporting on the PUCCH. With respect to a periodic CQI/PMI reporting, an RI reporting is transmitted only when the CSI feedback type is configured to support the RI reporting. In the case that the periodic reporting and the aperiodic reporting collide in the same subframe, the UE may perform only the aperiodic reporting.

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CSI. The CQI is more specifically described below.

A CQI that the UE reports corresponds to a specific index value. The CQI index has a value indicating a modulation technique, code rate, and the like that correspond to the channel state. For example, CQI indexes and meanings thereof may be given as shown in Table 3 below.

Table 3 exemplifies the interpretation of a CQI index based on QPSK (Quadrature phase shift keying), 16QAM (Quadrature Amplitude Modulation), 64QAM and 256QAM.

TABLE 3

| CQI index | Modulation | Code rate × 1024 |
| --- | --- | --- |
| 0 | out of range | |
| 1 | QPSK | 78 |
| 2 | QPSK | 193 |
| 3 | QPSK | 449 |
| 4 | 16QAM | 378 |
| 5 | 16QAM | 490 |
| 6 | 16QAM | 616 |
| 7 | 64QAM | 466 |
| 8 | 64QAM | 567 |
| 9 | 64QAM | 666 |
| 10 | 64QAM | 772 |
| 11 | 64QAM | 873 |
| 12 | 256QAM | 711 |
| 13 | 256QAM | 797 |
| 14 | 256QAM | 885 |
| 15 | 256QAM | 948 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). Even in the case that CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

In the case that all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. In the case that two or more combinations of a TBS and a modulation scheme are almost equal to the code rate indicated by the corresponding CQI index, a combination having the smallest TBS may be determined.

A CQI reference resource is defined as follows.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_ref may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field in the case that the length of DwPTS is less than or equal to 7680*Ts (Ts=1/(15000×2048) seconds), nor belongs to a measurement gap configured for the UE. In the case that there is no valid downlink subframe for the CQI reference resource, CQI reporting is not performed in uplink subframe n.

In the layer region, the CQI reference resource is defined as an RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmit diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, 3GPP TS 36.213 may be referred.

In summary, the downlink receiver (e.g., a UE) may configure a previous specific single subframe as a CQI reference resource with respect to the current time at which it is performing CQI calculation, and when a PDSCH is transmitted from the eNB on the CQI reference resource, may calculate a CQI value such that the error probability does not exceed 10%.

CSI Process

One or more CSI processes may be configured for a UE. Each CSI process may be associated with a CSI-RS resource for channel measurement and a CSI-interference measurement resource (CSI-IM resource). Specifically, one CSI process is defined as an association between an NZP CSI-RS resource for measurement of a desired signal and an interference measurement resource (IMR) for interference measurement. Each CSI process has an independent CSI feedback configuration. The independent CSI feedback configuration represents a feedback mode (the type of CSI (RI, PMI, CQI, etc.) and a transmission order of CSIs), a periodicity of feedback and a feedback offset.

One or more CSI-IM resource configurations may be provided for a UE. High layer parameters such as a zero power (ZP) CSI-RS configuration (i.e., configuration information about an RE position to which a ZP CSI-RS is mapped) and a ZP CSI-RS subframe configuration (i.e., configuration information about a periodicity and offset of occurrence of the ZP CSI-RS) may be configured for each CSI-IM resource configuration.

In addition, one or more ZP CSI-RS resource configurations may be provided for a UE. High layer parameters such as a ZP CSI-RS configuration list (i.e., 16-bit bitmap information about a ZP CSI-RS) and a ZP CSI-RS subframe configuration (i.e., configuration information about a periodicity and offset of occurrence of the ZP CSI-RS) may be configured for each ZP CSI-RS resource configuration.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

FIG. 11 illustrates an example of a component carrier and carrier aggregation in a wireless communication system to which the present invention may be applied.

FIG. 11(a) shows the structure of a single carrier used in an LTE system. A CC includes a DL CC and an UL CC. One component carrier may have a frequency range of 20 MHz.

FIG. 11(b) shows the structure of a carrier aggregation used in an LTE-A system. FIG. 11(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Coordinated Multi-Point Transmission and Reception (CoMP)

In accordance with the demand of LTE-advanced, CoMP transmission is proposed to enhance performance of a system.

CoMP is referred to as a scheme for two or more eNBs, Access Points (APs), transmission points (TPs) or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improve performance of UE positioned at a cell boundary and improve an average throughput of the cell (sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in the cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a coordinated scheduling/beamforming (CS/CB) method.

In case of JP method, the data headed from each eNB that performs the CoMP to UE is transmitted to UE instantaneously and simultaneously, and the UE combines the signal from each of the eNBs so as to improve the reception performance. Meanwhile, in the case of the CS/CB, the data headed to UE is transmitted instantaneously through a single eNB, and the scheduling or beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 12 is a diagram illustrating a CoMP system based on carrier aggregation in a wireless communication system to which the present invention may be applied.

FIG. 12 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 12 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

Small Cell Enhancement

In order to accommodate explosively increasing data traffic, research into a small cell enhancement technique to cover a relatively small area using small amount of power, relative to an existing macro cell, has been actively conducted.

Small cell enhancement refers to a technique of densely disposing small cells within macro cell coverage (or without macro cell coverage in case of the interior of a building, or the like) and maximizing spectrum efficiency per unit area through close cooperation between a macro cell eNB and a small cell eNB or between small cell eNBs to enable effective mobility management, while accommodating explosively increasing traffic. In particular, there is huge communication demand in a particular area such as a so-called hot spot within a cell, and receive sensitivity of propagation may be degraded in a particular area such as a cell edge or a coverage hole, and thus, a small cell may be used in a communication shadow area not covered by only a macro cell or an area, such as a hot spot, in which a large amount of data services is requested.

A macro cell eNB may also be called macro eNB (MeNB), and a small cell eNB may also be called small eNB, secondary eNB (SeNB), pico eNB, femto eNB, micro eNB, a remote radio head (RRH), a relay, a repeater, or the like. In this manner, a network in which macro cells and small cells coexist is called a heterogeneous network (HetNet).

Dual Connectivity

In the heterogeneous networks which supports small cell enhancement, there are various requirements related to mobility robustness, increased signalling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface. The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group. Here, "cell group" is a group of serving cells associated with either the Master eNB (MeNB) or the Secondary eNB (SeNB) in dual connectivity. "Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 13 illustrates network interfaces for Dual Connectivity in the wireless communication system to which the present invention can be applied.

FIG. 13(a) illustrates Control Plane architecture for Dual Connectivity, and FIG. 13(b) illustrates User Plane architecture for Dual Connectivity.

Inter-eNB control plane signalling for dual connectivity can be performed by means of X2 interface signalling. Control plane signalling towards the MME is performed by means of S1 interface signalling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB can be performed by means of X2 interface signalling.

Referring to the FIG. 13(a), the MeNB is C-plane connected to the MME via S1-MME, the MeNB and the SeNB are interconnected via X2-C.

FIG. 13(b) shows U-plane connectivity of eNBs involved in dual connectivity for a certain UE. U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

CoMP and CSI Process

FIG. 14 is a diagram illustrating an exemplary downlink CoMP operation in a wireless communication system to which the present invention may be applied.

In FIG. 14, a UE is positioned between eNB1 and eNB2 and the two eNBs, i.e. eNB1 and eNB2, perform a proper CoMP operation such as joint transmission (JT), dynamic cell selection (DCS), dynamic point blanking (DPB) or CS/CB to solve a problem of interference to the UE. To aid in the CoMP operation of the eNBs, the UE performs proper CSI feedback. Information transmitted through CSI feedback includes RI, PMI and CQI of each eNB and may additionally include channel information between the two eNBs (e.g. phase offset information between a channel from eNB1 to the UE and a channel from eNB2 to the UE) for JT.

While FIG. 14 illustrates the UE as transmitting a CSI feedback signal to eNB1 which is the serving cell thereof, the UE may report the CSI feedback signal to the eNB2 or to both eNBs depending on the situation.

In order to support CoMP scheduling in a network, the UE may feedback not only downlink (DL) CSI of a serving eNB/TP but also DL CSI of a neighboring eNB/TP. To this end, the UE may generate and feedback CSI about a plurality of CSI processes reflecting various interference environments of eNBs/TPs for data transmission.

An interference measurement resource (IMR) is used to measure interference when CoMP CSI calculation is performed. One or more IMRs may be configured for a UE. Each IMR may be independently configured. That is, a period, subframe offset, and resource configuration (i.e., RE mapping location) may be independently set for each IMR, and information thereabout may be signaled from the network to the UE via a high layer (e.g., an RRC layer).

A CSI-RS is used to measure a desired channel or signal for CoMP CSI calculation. One or more CSI-RSs may be configured for a UE. Each of the CSI-RSs is independently configured. That is, a transmission period, subframe offset, resource configuration (i.e., RE mapping location), assumption on transmit power (i.e., parameter Pc), and the number of antenna ports may be independently configured for each CSI-RS and signaled from the network to the UE via a high layer (e.g., an RRC layer). This may be referred to as a signal measurement resource (SMR).

One CSI process is defined by an association (combination) between one CSI-RS resource for signal measurement and one IMR for interference measurement from among the CSI-RSs and IMRs configured for the UE. The UE may feedback, to the network, CSI calculated or derived from different CSI processes according to the independent periods and subframe offsets. That is, each CSI process may have an independent CSI feedback configuration. The network may provide the UE with the information about the association (or combination) between a CSI-RS resource and an IMR and CSI feedback configuration through high layer signaling (e.g. RRC signaling, etc.) according to each CSI process. For example, in FIG. 14, three CSI processes as shown in Table 4 may be configured for the UE.

TABLE 4

| CSI process | SMR | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 4, CSI-RS 0 and CSI-RS 1 respectively represent a CSI-RS received from eNB1 which is a serving eNB of the UE and a CSI-RS received from eNB2 which is a neighboring eNB participating in cooperation.

In Table 4, CSI of CSI process 0 indicates optimum RI, PMI, and CQI given when data is received from eNB1. CSI of CSI process 1 indicates optimum RI, PMI, and CQI given when data is received from eNB2. CSI of CSI process 2 indicates optimum RI, PMI, and CQI given when data is received from eNB1 and there is no interference from eNB2.

Table 5 below shows configurations of the three IMRs of Table 4. IMR 0 is set as a resource on which eNB 1 performs muting (or transmission of a null signal), and eNB2 performs data transmission. The UE measures interference from eNBs except for eNB1 on IMR 0. IMR 1 is set as a resource on which eNB2 performs muting, and eNB1 performs data transmission. The UE measures interference from the eNBs except for eNB2 based on IMR 1. IMR 2 is set as a resource on which both eNB 1 and eNB2 perform muting. The UE measures interference from eNBs except for eNB1 and eNB2 based on IMR 2.

TABLE 5

| IMR | eNB 1 | eNB 2 |
|---|---|---|
| IMR 0 | muting | data transmission |
| IMR 1 | data transmission | muting |
| IMR 2 | muting | muting |

Method for Supporting a CoMP Operation Based on Non-Ideal Backhaul

A non-ideal backhaul (NIB) network refers to a network that has a certain delay (for example, 5 to 30 ms) in signal transmission and reception on a backhaul link between geographically separated CoMP points. The legacy CoMP operation has been designed on the assumption of an ideal situation in which control information is communicated on a backhaul link between CoMP points without suffering a delay, and thus enables dynamic scheduling decision between CoMP points on a subframe-by-subframe basis. For example, a dynamic point switching (DPS) scheme in which a TP for transmitting PDSCH is changed in every subframe may be supported. For example, DL assignment of DCI format 2D is provided to the UE which is set to transmission mode 10 (TM10) to support DPS, the 2-bit PQI field in DCI format 2D may be indicated by a specific status value. And accordingly, PDSCH RE mapping information about a TP transmitting PDSCH and QCL information between RSs may be dynamically provided.

However, the legacy CoMP operation cannot be applied to a CoMP operation on the NIB network. For example, in the case that a backhaul link between points participating in CoMP is an NIB, the PDSCH scheduling should be predetermined and shared between two points prior to delay in transmission and reception on the NIB in order for one point to inform of scheduling information about a PDSCH transmitted from the other point in a current subframe by providing the UE with DCI format 2D containing a PQI field in the subframe. This operation is close to static PDSCH scheduling according to a predetermined pattern rather than dynamic point selection. Accordingly, it is difficult to support the legacy CoMP operation on the NIB.

In this regard, the present invention proposes a method for correctly and efficiently performing or supporting CoMP on an NIB network Description below is mainly focused on CoMP operation between eNBs, but the principle of the present invention may also be applied to CoMP operation between MeNBs, SeNBs, Transmission Points (TPs), Reception Points (RPs), remote radio heads (RRHs), and relays. That is, it is understood that any of the terms eNB, MeNB, SeNB, TP, RP, RRH and relay encompasses all of the other terms.

Hereinafter, the present invention will be described based on a 3GPP LTE system, but the principle of the present invention is also applicable to a communication system based on another technology.

Xn-Signaling Information for NIB CoMP

FIG. 15 is a diagram illustrates a situation in which CoMP is not applied in a wireless communication system to which the present invention may be applied.

In FIG. 15, TP1 is the serving cell of the UE, and the UE receives DL scheduling information. The UE also receives a PDSCH from TP1.

In non-CoMP as shown in FIG. 15, TP1 and TP2 may exchange signaling for cooperative transmission through an NIB link. Since signaling for cooperative transmission is transmitted on an Xn link (e.g., X2 link/backhaul link) referring to a link between TPs, it may have the form of Xn-signaling. In addition, the signaling for cooperative transmission may include at least one of loading information, information about one or more CSI-RS configurations, information about one or more CSI-IM (or IMR) configurations and DMRS configuration information.

The loading information (or congestion information) may include information about the number of UEs accessing a specific TP (i.e., UEs considering the TP as the serving cell thereof). Additionally or alternatively, the loading information may include information indicating a portion in use or a surplus portion of the serviceable capacity of the specific TP such as, for example, a ratio (percentage) of the number of UEs currently accessing the specific TP to the maximum number of UEs capable of accessing the specific TP. The specific TP may deliver such loading information to another TP through Xn-signaling or multicast/broadcast the same to a plurality of TPs. In addition, the specific TP may make a request for provision of such loading information to other TPs.

The information about one or more CSI-RS configurations may include NZP CSI-RS configuration information (e.g., NZP CSI-RS RE location, period, offset, etc.) about a specific TP and/or ZP CSI-RS configuration information (e.g., ZP CSI-RS RE location, period, offset, etc.) about the specific TP. The NZP CSI-RS configuration information may be related to one or more NZP CSI-RS configurations, an NZP CSI-RS which the TP is actually transmitting, or an NZP CSI-RS configured for a specific UE. The ZP CSI-RS configuration information may be related to one or more ZP CSI-RS configurations and be applied to PDSCH rate matching. A specific TP may deliver the information about one or more CSI-RS configurations to another TP through Xn-signaling, or multicast/broadcast the same to a plurality of TPs. In addition, the specific TP may make a request for provision of information about one or more CSI-RS configurations to other TPs.

The information about one or more CSI-IM (or IMR) configurations may include information about one or more CSI-IM configurations (e.g., ZP CSI-RS RE location, period, offset, etc.) of a specific TP and/or information about whether or not the specific TP performs muting (or transmission) with respect to each of the CSI-IM configurations at the corresponding RE location. The information about the CSI-RS configurations of the specific TP may include information about a CSI-IM configuration established for specific UEs by the specific TP and information about a CSI-IM configuration (e.g., ZP CSI-RS RE location, period, offset, etc.) which is not established for UEs associated with the specific TP but established for UEs of neighboring TPs to provide a specific interference environment in which the UEs calculate/generate CSI. The specific TP may deliver such information about one or more CSI-IM configurations to another TP through Xn-signaling or multicast/broadcast the same to a plurality of TPs. In addition, the specific TP may make a request to other TPs for provision of the information about one or more CSI-IM configurations. The specific TP may also make a request to other TPs for performing muting (or transmission) at an RE location of a specific CSI-IM configuration.

For the DMRS configuration information, there is a need to support Xn-signaling for pre-exchanging, between TPs, a DMRS configuration (e.g., DMRS sequence scrambling initialization parameters) to be applied in the case that a TP transmits a PDSCH to each of UEs which are targets of CoMP transmission. For example, in a CoMP situation in which TP1 and TP2 are switched at different time intervals to transmit a PDSCH for the UE, TP2 needs to preannounce to TP1, through Xn-signaling, DMRS configuration information which TP2 uses to transmit a PDSCH to the UE. The UE can correctly perform PDSCH reception only when TP1 announces the DMRS configuration information to the UE through RRC signaling. This is because the latency of RRC signaling from TP1 to the UE may be greater than that of Xn-signaling between TP1 and TP2. Accordingly, in the case that TP1 announces the DMRS configuration information pre-received from TP2 to the UE through RRC signaling, the UE may correctly receive the PDSCH from TP2 based on the DMRS configuration of TP2.

Herein, information about a specific CSI-IM configuration needs to be uniquely indicated within a network (e.g., a CoMP cluster) including a plurality of TPs. That is, for TP2 having received information indicating a specific CSI-IM configuration intended by TP1 to know the CSI-IM configuration intended by TP1 from the information, CSI-IM configuration information indicating a corresponding CSI-IM configuration needs to be predefined among the TPs. Accordingly, the present invention proposes that network-wise CSI-IM configuration information (hereinafter, NW-CSI-IM configuration information) be defined. For example, NW-CSI-IM configuration information may be defined by an NW-CSI-IM index (or NW-CSI-IM configuration index) to each CSI-IM configuration. The NW-CSI-IM configuration information may be communicated between TPs in the form of Xn-signaling.

For example, suppose that three eNBs construct one CoMP cluster. In this case, M NW-CSI-IM indexes may be defined. For example, 7 NW-CSI-IM indexes may be given as shown in Table 6 below.

TABLE 6

| NW-CSI-IM index | eNB1 | eNB2 | eNB3 |
|---|---|---|---|
| NW-CSI-IM index 1 | muting | muting | muting |
| NW-CSI-IM index 2 | muting | muting | non-muting |

TABLE 6-continued

| NW-CSI-IM index | eNB1 | eNB2 | eNB3 |
|---|---|---|---|
| NW-CSI-IM index 3 | muting | non-muting | muting |
| NW-CSI-IM index 4 | muting | non-muting | non-muting |
| NW-CSI-IM index 5 | non-muting | muting | muting |
| NW-CSI-IM index 6 | non-muting | muting | non-muting |
| NW-CSI-IM index 7 | non-muting | non-muting | muting |

As shown in Table 6, the proposed NW-CSI-IM configuration information may directly indicate whether or not muting is to be performed for each specific eNB.

Table 6 is simply illustrative. Event cases marked by "non-muting" may be subdivided into a plurality of transmit power levels. In this case, M may be set to a value greater than 7. When NW-CSI-IM configuration information is defined in consideration of various interference hypotheses as above, M may be set to a value greater than 7. Alternatively, in the case that only some cases are defined without considering all cases of muting of each eNB, M may be set to a value less than 7.

The NW-CSI-IM configuration information may not only indicate muting of each eNB (or a power level for non-muting) but also indicate that the behavior of a specific eNB does not matter. For example, the NW-CSI-IM configuration information may be defined as indicating "muting," "non-muting," or "don't care" for each eNB in the CoMP cluster. For example, NW-CSI-IM index 8 may be added to Table 6 and the NW-CSI-IM configuration information may be defined as shown in Table 7 below.

TABLE 7

| NW-CSI-IM index | eNB1 | eNB2 | eNB3 |
|---|---|---|---|
| NW-CSI-IM index 1 | muting | muting | muting |
| NW-CSI-IM index 2 | muting | muting | non-muting |
| NW-CSI-IM index 3 | muting | non-muting | muting |
| NW-CSI-IM index 4 | muting | non-muting | non-muting |
| NW-CSI-IM index 5 | non-muting | muting | Muting |
| NW-CSI-IM index 6 | non-muting | muting | non-muting |
| NW-CSI-IM index 7 | non-muting | non-muting | Muting |
| NW-CSI-IM index 8 | non-muting | don't care | Muting |

That is, in NW-CSI-IM index 8, the operation of eNB2 on the corresponding NW-CSI-IM resource may be set to "don't care". This means that eNB2 may determine, as eNB2 desires, whether to perform muting or non-muting on the corresponding NW-CSI-IM resource or precoding and power assignment applied to a signal to be transmitted when eNB2 performs non-muting. Accordingly, the other eNBs (e.g., eNB1 and eNB3) cannot predict the behavior that eNB2 performs on the corresponding NW-CSI-IM resource, it may not be ensured that interference caused by eNB2 is uniform.

As in the examples above, an Xn-signaling format (e.g., backhaul signaling format) explicitly indicating hypotheses of behaviors of individual eNBs on a specific CSI-IM resource may be designed, and CSI-IM configuration information may be exchanged between eNBs according to the Xn-signaling format. For example, each NW-CSI-IM index may be defined as explicitly indicating, for each eNB, one or more elements from a set including {muting, a predetermined maximum or minimum power level value, specific precoding information (e.g., a beam direction, a precoding coefficient, or a precoding set), "don't care"}, and backhaul signaling may be performed using a specific NW-CSI-IM index.

In addition, the NW-CSI-IM configuration information may be used in signaling between eNBs, or may be used as information about a CoMP hypothesis indicated to the UE by an eNB. For example, eNB1 may configure some (or all) of the NW-CSI-IM indexes 1, 2, 3 and 4 for UEs accessing eNB 1 through a higher layer signal such as an RRC signal. For example, two NW-CSI-IM indexes of NW-CSI-IM index 4 (reflecting a non-CoMP interference environment) and NW-CSI-IM index 2 (reflecting a CoMP environment in which eNB2 performs muting) may be configured, through an RRC signal, for CoMP UE1 accessing eNB1, and NW-CSI-IM indexes 2 and 4 may be included in a separate CSI process. And accordingly, CoMP UE1 may calculate/generate CSI based on different CoMP hypotheses (e.g., different interference environments) and feed the same back to eNB1. For example, for CoMP UE1, NW-CSI-IM index 4 may be configured as csi-IM-ConfigId-r11=1, and NW-CSI-IM index 2 may be configured as csi-IM-ConfigId-r11=2.

That is, one of {1, . . . , maxCSI-IM-r11} may be designated and set as a csi-IM-ConfigId-r11 value for individual UEs, and may correspond to the NW-CSI-IM index 1, . . . , 7 uniquely assigned on a network (e.g., a CoMP cluster).

As another example, eNB2 may configure some (or all) of NW-CSI-IM indexes 1, 2, 5 and 6 for UEs accessing eNB2 through a higher layer signal such as an RRC signal, and the UEs may calculate and feedback CSI in consideration of different CoMP environments corresponding to the NW-CSI-IM indexes.

In the examples above, methods to define information indicating a CSI-IM configuration network-wise have been mainly described. The same principle may also be applied to NZP CSI-RS configuration information and ZP CSI-RS configuration information. That is, by defining NW-NZP-CSI-RS configuration information (or an NW-NZP-CSI-RS index) and/or NW-ZP-CSI-RS configuration information (or an NW-ZP-CSI-RS index) in a specific-scale network (e.g., CoMP cluster) including a plurality of eNBs, a specific NW-NZP-CSI-RS configuration and/or specific NW-ZP-CSI-RS configuration may be uniquely designated for the eNBs (and UEs served by the eNBs) in the network.

Further, the concept of network-wise definition of information indicating a CSI-IM configuration may also be applied to CSI process configuration information. For example, one CSI process index may be defined as a combination of (one) NZP CSI-RS index and (one) CSI-IM index. That is, by defining NW-CSI-process configuration information (or an NW-CSI-process index) in a specific-scale network (e.g., a CoMP cluster) including a plurality of eNBs, a specific NW-CSI-process configuration may be uniquely designated for eNBs (and UEs served by the eNBs) in the network.

The aforementioned loading information, information about one or more CSI-RS configurations, information about one or more CSI-IM (or IMR) configurations, or DMRS configuration information may need to be pre-exchanged (or periodically exchanged) between TPs participating in a CoMP operation through, for example, Xn-signaling. That is, such information may need to be pre-exchanged between TPs participating in the NIB CoMP operation through, for example, Xn-signaling in order to use the information to determine when to initiate the CoMP operation (e.g., TP1 performs muting in a situation of loading of TP1 if possible) even in the case that there is an Xn-signaling delay (of, for example, tens of milliseconds).

The loading information, information about one or more CSI-RS configurations, information about one or more CSI- IM (or IMR) configurations, or DMRS configuration information may not be limited to use during CoMP operation, but may also be used for other purposes, for example, to support the operation of a UE employing a network-assisted interference cancellation and suppression scheme.

CoMP Network Architecture and Xn-Signaling for Resource Coordination

In various examples of the present invention, one of a plurality of TPs participating in the CoMP operation or a specifically defined central control node (CCN) may perform coordination decision and deliver a coordination result (or resource coordination result).

A coordination architecture having no CCN to control the TPs participating in the CoMP operation may be called a distributed coordination architecture and a coordination architecture having a CCN may be called a centralized coordination architecture.

For example, a CCN may be one of a plurality of eNBs that participates in the CoMP or an MME. In addition, in the case that an MeNB and an SeNB support the CoMP operation, the CCN may be the MeNB, and in the case that a plurality of SeNBs supports the CoMP operation, the CCN may be the MeNB or one of a plurality of SeNBs.

For clarity of description, Xn-signaling is simply described as being performed between specific TPs in various examples of the present invention. The Xn-signaling may refer to Xn-signaling between TPs of the distributed coordination architecture or Xn-signaling between a CCN and a TP of the centralized coordination architecture.

Regarding the proposed details described in the Xn-signaling for SSPM, Xn-signaling for indicating the resource coordination request or resource coordination result may be designed to indicate specific indexes on a specific frequency-time resource basis (e.g., Physical Resource Block (PRB) unit and/or subframe unit) among NW-CSI-IM indexes known to a sender TP (or sender eNB) as shown in Table 8 below.

TABLE 8

| IE/Group Name | Semantics description |
| --- | --- |
| Indication of resource coordination (notice/result or request) | Per PRB (and/or per subframe index based on a subframe bitmap), NW-CSI-IM index(es) are listed, meaning the transmission assumptions (including transmitted power and/or precoding information) on the REs corresponding to the listed NW-CSI-IM indexes can be assumed the same on the indicated PRB (and/or subframe index) |

As shown in Table 8, the meaning of the NW-CSI-IM indexes indicated through Xn-signaling may be interpreted as follows.

A transmitter eNB transmitting NW-CSI-IM indication information may inform receiver eNB(s) receiving the same that the NW-CSI-IM indication information is about a resource coordination notice/result, or a predetermined selector bit for informing of a resource coordination request may exist. For example, the NW-CSI-IM indication information may be interpreted as indicating a resource coordination notice/result or a resource coordination request depending on the value of the selector bit contained in the NW-CSI-IM indication information. Alternatively, the NW-CSI-IM indication information may be defined to be interpreted as information about a resource coordination notice/result in the case that there is no separate indication (namely, to be interpreted, by default, as information indicating a resource coordination notice/result). In this case, to indicate that the NW-CSI-IM indication information is about a resource coordination request, special indication information needs to be included. (e.g., the NW-CSI-IM indication information may be interpreted as indicating a resource coordination request in the case that a specific field has a special value. Otherwise, the information may be interpreted as indicating a resource coordination notice/result). Alternatively, separate Xn-signaling formats may be designed for the resource coordination notice/result and the resource coordination request.

NW-CSI-IM Indication Information Indicating Resource Coordination Notice/Result

The NW-CSI-IM indication information may be interpreted as indicating that it can be assumed that the property (e.g., transmit power and/or precoding information) of a (interference) signal which a sender eNB transmits at an RE location (time/frequency resource location) set on NW-CSI-IM index(es) listed in the NW-CSI-IM indication information is the same as the property of a signal (e.g., PDSCH) that the transmitter eNB actually transmits on an indicated PRB and/or subframe index location.

This interpretation of the NW-CSI-IM indication information may be mainly applied to the distributed coordination architecture. For example, when the transmitter eNB transmits a signal in the form of information of one or more CSI-IM (or IMR) configurations as shown in Table 6 or 7 on a specific NW-CSI-IM resource through "non-muting", the transmitter eNB may notify the receiver eNB(s) that a signal property applied to the NW-CSI-IM resource is the same as the signal property applied to a specific frequency/time resource (or another frequency/time resource map). When other eNBs having received this notice information perform UE scheduling on a specific frequency/time resource indicated by the received information, they may determine or select a precoder, MCS and the like to be applied to DL transmission, based on the CSI feedback information provided by the UE for an NW-CSI-IM index that the transmitter eNB has signaled as information associated with the specific frequency/time resource.

In addition, in the case that a receiver eNB receives NW-CSI-IM indication information from multiple transmitter eNBs through Xn-signaling with respect to a specific frequency/time resource map, the receiver eNB may determine specific NW-CSI-IM index(es) indicated in common as an intersection of NW-CSI-IM indexes indicated by the information provided by the transmitter eNBs. And accordingly, CSI process indexes including the specific NW-CSI-IM indexes indicated in common may be determined, and the receiver eNB may receive a configuration of the CSI process indexes and consider the UE performing CSI feedback as a scheduling target. That is, given multiple eNBs set to "non-muting" for specific NW-CSI-IM indexes (e.g., NW-CSI-IM indexes 4, 6 and 7 in Table 6 or 7) to apply a specific signal on the corresponding resource, channel information recognized from a CSI feedback report which is based on the property of interference measured by the UE on the indicated NW-CSI-IM index(es) may become as similar to the channel state on a specific time/frequency resource used for UE scheduling as possible only when UE scheduling is performed for a specific time/frequency resource map on which NW-CSI-IM indication information has been received from as many eNBs as possible.

The NW-CSI-IM indication information may also be defined or configured to be transmitted to eNBs belonging to a specific eNB set (e.g., a CoMP cluster) in a multicast/broadcast manner. Herein, the specific eNB set may be predefined, or may be determined or configured through pre-negotiation between specific eNBs (or eNB sets) through separate Xn-signaling. That is, the NW-CSI-IM indication information may deliver IEs as shown in Table 8 through multicast/broadcast signaling directed to multiple eNBs belonging to a CoMP cluster rather than through unicast signaling sent to one receiver eNB. And accordingly, the multiple eNBs receiving this information may indicate NW-CSI-IM indexes associated with each other to a frequency/time resource map as similar to the frequency/time resource map indicated by the transmitter eNB as possible in the best effort form and exchange the same sequentially (or in series) through Xn-signaling. Preferably, for example, for PRBs showing no noticeable difference in frequency selectivity, the receiver eNB having received the NW-CSI-IM indication information selects the same NW-CSI-IM indexes, if possible, with reference to the frequency/time resource map of the transmitter eNB that has provided the Xn-signaling first, and transmits Xn-signaling directed to other eNBs. For example, in Table 6 or 7, if eNB2 indicates "NW-CSI-IM indexes 3, 4 and 7" for a specific frequency/time resource map, eNB3 receiving the indexes conforms to a form as similar to the frequency/time resource map as possible (by, for example, configuring a frequency/time resource map such that as many frequency/time resources as possible overlap each other although some frequency/time resources may be the same or different), and indicate "NW-CSI-IM indexes 2, 4 and 6" to eNB1 through Xn-signaling. When eNB1 receives NW-CSI-IM indication information from eNB2 and eNB3, eNB1 may select NW-CSI-IM index 4 as an intersection between the information, and consider a UE for which a specific CSI process including the selected index is configured as a scheduling target first.

In addition, regarding the frequency/time resource map, it may be effective to pre-divide a CoMP-allowed region and a CoMP-disallowed region through separate Xn-signaling and align CoMP-allowed regions of the eNBs as much as possible through negotiation between the eNBs. That is, the eNBs may predetermine a specific frequency/time resource to which CoMP is not applied, in consideration of a guaranteed bit rate (GBR) bearer, and pre-exchange this information to utilize the information in pre-negotiating the CoMP-allowed regions. More specifically, a subset of eNBs greatly affecting a CSI-IM resource for each NW-CSI-IM index may be pre-constructed/preconfigured for each NW-CSI-IM index (e.g., a subset may be pre-constructed/pre-configured with eNBs that geographically neighbor each other), and negotiation for alignment of the frequency/time resource map may be mainly performed between eNBs. For example, even in the case that Xn-signaling for the negotiation for the frequency/time resource map is multicast/broadcast to a specific eNB set such as the CoMP cluster, eNBs having higher priorities as negotiation targets may be separately designated.

In order to allow the operations above to be smoothly performed, Xn-signalings should avoid overlapping each other within a specific eNB set such as the CoMP cluster as described above. To this end, the eNBs in the specific eNB may take turns sequentially (serially) to transmit Xn-signaling according to a pre-defined or preconfigured period and/or offset.

NW-CSI-IM Indication Information Indicating Resource Coordination Request

The NW-CSI-IM indication information may be interpreted as requesting that the property (e.g., transmit power and/or precoding information) of a (interference) signal which a receiver eNB transmits at an RE location (time/frequency resource location) set on NW-CSI-IM index(es) listed in the NW-CSI-IM indication information should be the same as the property of a signal (e.g., PDSCH) that the receiver eNB actually transmits on an indicated PRB and/or subframe index location.

In the case where the NW-CSI-IM indication information indicates a resource coordination request, the sender eNB used in the case where the NW-CSI-IM indication information indicates a resource coordination notice/result is switched to the receiver eNB. In addition, the proposed examples of the case of the NW-CSI-IM indication information indicating a resource coordination notice/result may be applied as examples of the case of the NW-CSI-IM indication information indicating a resource coordination request by switching the transmitter eNB to the receiver eNB and vice versa.

Additionally, once the receiver eNB receives the NW-CSI-IM indication information indicating a resource coordination request, the receiver eNB may send a response message through signaling indicating acceptance or rejection of the request.

The response message may simply indicate acceptance or rejection, but the intention of acceptance or rejection may be delivered using another method.

For example, Xn-signaling for "Rejected" may be replaced by the NW-CSI-IM indication information indicating the resource coordination notice/result. In this case, the receiver eNB having received the resource coordination request may be understood as delivering, to the transmitter eNB having transmitted the resource coordination request, a resource coordination notice/result indicating "Rejected" for the request and reconfigured in a different form by the receiver eNB through Xn-signaling.

Xn-signaling for "Accepted" may be configured to include a case where the receiver eNB does not transmit response signaling to the transmitter eNB (namely, a response is omitted). That is, in the case that the transmitter eNB sends NW-CSI-IM indication information indicating a resource coordination request to the receiver eNB through Xn-signaling, the request may be defined or configured to be accepted by default as long as there is no separate response from the receiver eNB. This operation may be effectively utilized in the centralized coordination architecture. For example, when a CCN (or a specific eNB (e.g., Macro-eNB) serving as a CCN; hereinafter, referred simply to as CCN) delivers NW-CSI-IM indication information indicating a resource coordination request to other eNBs through Xn-signaling, a receiver eNB receiving the information may be configured not to signal a response message or configured to signal a response message indicating "accepted" depending on the type of the transmitter eNB (e.g., only if the sender eNB is a CCN or macro-eNB). In this case, the Xn-signaling transmitted from the transmitter eNB takes the form of a resource coordination request, but substantially functions as a command for resource coordination. Consequently, a centralized coordination architecture including a transmitter eNB (e.g., a CCN) and other receiver eNBs (e.g., non-CCNs) may be configured.

In a distributed coordination architecture, on the other hand, in the case that a receiver eNB having received NW-CSI-IM indication information indicating a resource coordination request sends a response message indicating acceptance of the request, the transmitter eNB having transmitted the NW-CSI-IM indication information indicating the resource coordination request may determine or select a precoder, MCS and the like to be applied to DL transmission, based on the CSI feedback information about a specific NW-CSI-IM index associated with a specific frequency/time resource provided by a corresponding UE when the transmitter eNB scheduling the UE on the specific frequency/time resource indicated by the NW-CSI-IM indication information.

Centralized Coordination Architecture Xn-Signaling

Hereinafter, a benefit metric will be described as additional Xn-signaling which can be advantageously used in various examples proposed in the present invention, in particular, a centralized coordination architecture.

The benefit metric may be a UE scheduling metric or utility metric of a specific frequency/time resource map sent from each eNB to the CCN. In the description below, the term utility metric will be mainly used, but this term should be understood as a term representing the UE scheduling metric or the benefit metric.

A utility metric may be defined as a value for the data rate or throughput that may be expected when a specific UE is scheduled on a specific frequency/time resource (e.g., a resource defined on the PRB and/or subframe index basis). For example, the utility metric may be defined as a value obtained by dividing a data rate (or throughput) expectable for a specific UE by the average data rate (or average throughput) of the UE. In addition or alternatively, the utility metric may be defined as a value for a data rate (or throughput) expectable for a specific UE that is derived in consideration of QoS of the UE (e.g., a value calculated according to a specific function predefined or preconfigured according to QoS of the UE).

For example, in the case that the utility metric value increases, this may mean that performing UE scheduling on the corresponding frequency/time resource is advantageous to the eNB. Accordingly, in the case that a transmitter eNB transmits such utility metric to a CCN through Xn-signaling, this may be interpreted as meaning that the transmitter eNB provides the CCN with information indicating that the transmitter eNB prefers performing data (e.g., PDSCH) transmission to performing muting on a frequency/time resource having a high utility metric value.

A plurality of utility metrics may be transmitted for a specific frequency/time resource through Xn-signaling. In this case, each utility metric may have a value calculated on the assumption of different CoMP hypothesis. Herein, the different CoMP hypothesis may mean a different interference environment, may be defined as a pattern indicating whether or not muting is performed by each eNB, or may mean a different CSI process unit.

As a method to express different CoMP hypotheses that the transmitter eNB assumes through Xn-signaling, the format of one or more CSI-IM (or IMR) configurations information as shown in Table 6 or 7 may be employed. For example, a utility metric value may be calculated for each "NW-CSI-process index" and transmitted through Xn-signaling, or may calculated for each "NW-NZP-CSI-RS index and/or NW-CSI-IM index" and transmitted through Xn-signaling.

For example, a utility metric value may be calculated and transmitted through Xn-signaling on the assumption of data (e.g., PDSCH) transmission based on CSI feedback of a corresponding UE per specific frequency/time resource (e.g., PRB and/or subframe index) according to specific NW-CSI-process index(es), as shown in Table 9 below.

TABLE 9

| IE/Group Name | Semantics description |
|---|---|
| Utility metric (or UE scheduling metric, or benefit metric) | Per PRB (and/or per subframe index based on a subframe bitmap), pair(s) of {utility metric(U bits), NW-CSI-process index(es)} are listed, meaning the utility metric value is calculated assuming the (PDSCH) transmission based on the CSI feedback according to the indicated NW-CSI-process index |

As represented in Table 9, a utility metric may have the size of U bits, and a pair of a utility metric and NW-CSI-process index(es) may be Xn-signaled.

Another utility metric calculated on the assumption of different NW-CSI-processes may also be Xn-signaled. That is, as represented in Table 9, one pair or a plurality of pairs of {utility metric, NW-CSI-process index(es)} may be Xn-signaled.

As one NW-CSI-process index is configured by a combination of one NW-NZP-CSI-RS index and one NW-CSI-IM index, calculating a utility metric for each NW-CSI-process index may mean that a channel (or desired signal) is measured based on the NW-NZP-CSI-RS indicated by a NW-CSI-process index, interference is measured based on the NW-CSI-IM indicated by the NW-CSI-process index, and a utility metric is calculated assuming that a PDSCH is transmitted based on CSI feedback information (e.g., RI, PMI, and CQI) calculated/generated based on the results of the measurements.

A CCN may receive Xn-signaling containing such utility metric from multiple eNBs, and perform global optimization within a specific eNB set (e.g., CoMP cluster) including the eNBs, based on all the received information. Accordingly, NIB CoMP operation may be efficiently performed by transmitting the eNBs Xn-signaling containing information indicating a resource coordination request from each eNB (e.g., Xn-signaling containing NW-CSI-IM indication information indicating a resource coordination request (which is substantially a resource coordination command)).

For example, in the case that the CCN selects the highest utility metric value for a specific frequency/time resource as a resource coordination result, the CCN may recognize specific NW-CSI-IM index(es) associated with corresponding NW-CSI-process index(es) because the CCN is already aware of the NW-CSI-process index(es) forming the basis of calculation of the selected utility metric (i.e., a pair of {utility metric, NW-CSI-process index(es)} shown in Table 9). Accordingly, the CCN may configure Xn-signaling in the form of NW-CSI-IM indication information indicating a resource coordination request (or resource coordination command) and transmit the same to the eNBs.

As described above, in the Table 9, the "NW-CSI-process index(es)" may be replaced by "NW-NZP-CSI-RS index(es) and/or NW-CSI-IM index(es)". In this case, a utility metric IE may be defined as shown in Table 10 below.

TABLE 10

| IE/Group Name | Semantics description |
| --- | --- |
| Utility metric (or UE scheduling metric, or benefit metric) | Per PRB (and/or per subframe index based on a subframe bitmap), pair(s) of {utility metric(U bits), NW-NZP-CSI-RS index(es) and/or NW-CSI-IM index(es)} are listed, meaning the utility metric value is calculated assuming the (PDSCH) transmission based on the CSI feedback according to the indicated NW-NZP-CSI-RS index(es) and/or NW-CSI-IM index(es) |

The embodiment employing Xn-signaling for a utility metric IE defined in Table 10 may be applied as an embodiment employing "NW-NZP-CSI-RS index(es) and/or NW-CSI-IM index(es)" in place of "NW-CSI-process index(es)" in Table 9.

Specifically, this may mean that each eNB measures a channel (or desired signal) based on the indicated NW-NZP-CSI-RS, measures interference based on the indicated NW-CSI-IM, and calculate a utility metric assuming that a PDSCH is transmitted based on CSI feedback information (e.g., RI, PMI, and CQI) calculated/generated based on the results of the measurements.

Alternatively, in the example of Table 10, Xn-signaling may be configured in the form of one or more pairs of {utility metric (U bits), NW-CSI-IM index(es)}, omitting the information indicating the NZP-CSI-RS index(es). In this case, the NW-NZP-CSI-RS index(es) forming the basis of calculation of the utility metric may be interpreted as being separately signaled by the transmitter eNB transmitting the utility metric, and the specific NW-NZP-CSI-RS index(es) being configured/transmitted by the transmitter eNB may be interpreted as being implicitly indicated.

Xn-Signaling of Utility Metric Related Information

In addition to or in place of Xn-signaling the utility metric as shown in Table 9 or 10, element information for calculating the utility metric may be exchanged between eNBs through Xn-signaling on the frequency/time resource basis.

In addition, in the centralized coordination architecture, element information for calculating the utility metric may be designed to be transmitted from eNBs to the CCN.

The element information may include at least one of the following examples:

- One or more sets of CSI reports (e.g., RI, PMI, CQI) of UEs to be scheduled
- One or more sets of measurement reports (e.g., RSRP) of UEs to be scheduled
- Sounding reference signal (SRS) reception power of UEs to be scheduled
- User perceived throughput (UPT) of UEs to be scheduled
- Proportional fair (PF) metric of UEs to be scheduled
- QoS class identifier (QCI) of UEs to be scheduled.

In the examples above, the "UE(s) to be scheduled" may be defined or configured to be interpreted as meaning that information about specific UEs, which the eNB desires to schedule on a corresponding frequency/time resource, is included in the element information. That is, this operation may be understood as delivering the element information about the best UE or representative UE to the receiver eNB rather than delivering the element information about all individual UEs served by the sender eNB. Accordingly, Xn-signaling overhead may be significantly reduced. In addition, overall optimization may be readily performed in the CoMP cluster even in the case that element information about only some UEs is collected by the CCN.

More specifically, in the examples above, the "UE(s) to be scheduled" may be interpreted as "a set of (active) UEs". This may be interpreted as meaning that element information about all active UEs is signaled or that element information about some of active UEs (which may be selected by the sender eNB) is signaled.

Even in the case that element information about some UEs is signaled, the minimum number of UEs in the "set of UEs" may be set to 1. That is, the transmitter eNB may be defined to signal element information about at least one UE. For example, when it is requested or indicated according to the Xn-signaling protocol (by, for example, a predetermined invoke message) that the element information as above should be transmitted, or when the transmitter eNB attempts to transmit the element information through Xn-signaling between eNBs for the first time, the minimum number of UEs in the "set of UEs" may be set to 1.

Alternatively, the minimum number of UEs in the "set of UEs" may be allowed, on the Xn-signaling protocol, to be set to 0 according to the type of the element information. For example, the minimum number of UEs belonging to UEs (i.e., "a set of UEs") to be scheduled in "one or more sets of CSI reports (e.g., RI, PMI, CQI) of UEs to be scheduled" may be defined to be 1, and the minimum number of UEs belonging to UEs (i.e., "a set of UEs") to be scheduled in "one or more sets of measurement reports (e.g., RSRP)" may be defined to be 0. This may be interpreted as meaning that CSI information about at least one UE needs to be provided to another eNB, but RSRP information may be optionally provided in performing Xn-signaling for element information. Alternatively, in the case that RSRP information is not provided, (i.e., RSRP information about zero UE is provided), this may mean that the previously provided RSRP information about specific UEs does not change, and thus the corresponding value is not updated.

In addition, the UEs belonging to the "UEs to be scheduled" or "set of UEs" may be selected from among UEs satisfying minimum requirements. For example, CoMP configurable UEs (e.g., UEs set to transmission mode 10 or a higher mode), UEs for which two or more CSI processes are configured, or UEs for which the maximum number of CSI processes which are supportable according to UE capability information is greater than or equal to 2 may be defined to be included in the "set of UEs".

In addition to the examples of element information related to the utility metric, transmission buffer information (e.g., "Status of transmission queues") may be Xn-signaled.

The status of transmission queues information may be used to minimize delay in packet delivery. For example, as the length of a queue increases, the utility metric value may increase. For example, by Xn-signaling the length information about a transmission queue of an eNB, a CCN may assign a high utility metric value in the case that the CCN determines that the queue is long (this may mean that a maximum delay scheduling algorithm is applied).

The transmitter eNB may transmit the status of transmission queues information through Xn-signaling at intervals of T ms. In this case, the status of transmission queues may include one of the following pieces of information at a specific time:

- Information indicating a current transmit buffer status for each specific UE;
- Information indicating the amount of data (number of packets) that has been scheduled since the previous Xn-signaling time (e.g., the time before T ms);

Information indicating the amount of new data (number of packets) that has been additionally stacked in the buffer since the previous Xn-signaling time (e.g., the time before T ms);

Information indicating queue status accumulated in the transmission queue up to the current time.

Using one or more of the information, a network node (e.g., CCN) receiving Xn-signaling of the information may recognize the amount of data stacked in the transmitter eNB transmitting the information, and assign a higher weight to an eNB in which a larger amount of data is stacked at the time of resource coordination/assignment.

Meanwhile, in the "integrated Xn-signaling" described below, Xn-signaling information referred to as "benefit metric" or "preference rating value" may include "transmit buffer and queue status information". The examples included in the "status of transmission queues" information described above may be defined or configured to be transmitted in the form of "transmit buffer and queue status information". For example, in the "transmit buffer and queue status information", the "transmit buffer status" information may mean "information indicating current transmit buffer status for each specific UE", and the "queue status" information may mean "information indicating the queue status accumulated in the transmission queue up to the current time". As such, some or a combination of a plurality of specific examples of the "status of transmission queues" may be transmitted through Xn-signaling as content of a message for delivering various kinds of buffer status-related information.

Example 1 of NIB CoMP Signaling Between eNBs

The following information may be signaled on an Xn interface (e.g., X2 interface) between eNBs for NIB CoMP:

CoMP hypothesis. The CoMP hypothesis may include hypothetical resource allocation for at least a receiver node in the time/frequency;

One or more sets of CSI information (RI, PMI, CQI) about a set of UEs;

One or more measurement reports (RSRP) on a set of UEs;

Improved RNTP (Enhanced Relative Narrowband Tx Power). The information configuration granularity of the improved RNTP may be extended in the frequency/time domain. In addition, information in the improved RNTP may include a transmit power threshold only for a transmitter eNB, and be configured in multiple levels. To exchange the utility status of an indicated frequency/time resource, the conventionally defined status report may be signaled between eNBs;

Benefit metric.

Hereinafter, details that need to be specifically defined in the Xn-signaling information will be described.

1) CoMP Hypothesis

The CoMP hypothesis includes hypothetical resource allocation for at least a receiver node in the time/frequency domain, which is intended to support centralized coordination. Signaling of such CoMP hypothesis may be used to indicate the result of resource coordination determined by a CCN, or may be used as a hypothetical condition assumed for benefit metric signaling (without a time/frequency configuration granularity).

How to respond to the received CoMP hypothesis signaling depends on implementation of the receiver eNB, or the receiver eNB may transmit the transmitter node feedback (e.g., YES/NO) indicating acceptance/rejection of the hypothesis.

The configuration granularity and signaling period of a time/frequency domain necessary for the CoMP hypothesis may be set on the PRB and subframe basis and be indicated by an L-bit subframe. In consideration of different NIB delay and signaling periods, it is proposed that the maximum value of L be 10. A proper signaling period L for the CoMP hypothesis may differ between transmitter nodes, and accordingly the value of L may be included in the CoMP hypothesis signaling information, or the receiver node may request the period value (i.e., the L value). The CoMP hypothesis information may include cell-specific power assignment information (information indicating whether or not muting is performed, information indicating a power level, or the like) and be identified by a cell ID.

2) Benefit Metric Associated with CoMP Hypothesis

The benefit metric may be defined as follows.

The benefit metric, which is associated with the CoMP hypothesis, is information quantifying the benefit that a cell of the transmitter node expects in performing scheduling on the assumption of the associated CoMP hypothesis.

The cell-specific benefit metric is calculated as the maximum value in the result of a function that the operation defines from element information given for each of active UEs in the corresponding cell. The element information may be a CSI report (RI, PMI, CQI) set, one or more measurement reports (RSRP), average user throughput, transmit buffer and queue status information, and QCI that correspond to the associated CoMP hypothesis.

FIG. 16 illustrates a benefit metric signaled together with a CoMP hypothesis for a frequency/time resource map.

In FIG. 16, the CoMP hypothesis may be indicated by a power assignment list for individual eNBs. The power assignment list may be configured to explicitly indicate the power assignment value for eNB1, the power assignment value for eNB2, . . . . , and the power assignment value for eNB N. Alternatively, the CoMP hypothesis may be indicated in a simpler form such as an NW CSI-IM index. That is, one index value may indicate operation of individual eNBs.

The benefit metric may be signaled together with the associated CoMP hypothesis without a time/frequency configuration granularity. Specifically, the signaled benefit metric means a quantized benefit value which the cell of the transmitter node expects in performing scheduling on the assumption of the associated CoMP hypothesis (e.g., a muting/non-muting pattern of a neighboring cell).

The transmitter node may signal a plurality of benefit metrics, and each of the benefit metrics is associated with a different CoMP hypothesis. Accordingly, each benefit metric may represent preference rating of a corresponding CoMP hypothesis (information indicating not only operation of the transmitter eNB but also operations of the other eNBs) in view of the transmitter eNB.

As the benefit metrics are signaled together with CoMP hypotheses, the transmission period of the benefit metrics may be configured to be equal to the transmission period (e.g., period value L) of the CoMP hypotheses.

The information of a benefit metric may be defined as an integer value between 0 and B (B>0). As the benefit metric is defined as a quantized value considering all active UEs in a cell, B may be set to 100, for example. As a simple example, a PF metric derived from at least one CSI report set and average user throughput corresponding to an associated CoMP hypothesis may be used to calculate the benefit metric. Herein, one or more measurement reports (RSRP) may also be used to calculate CQI. Since the CQI is calculated not by a CCN but by a transmitter eNB, QCI or additional information such as transmit buffer and queue status information may be used. When benefit metrics associated with different CoMP hypotheses reach the CNN from a plurality of sender nodes, the CCN may use all the information provided from member eNBs to determine resource coordination. In the case that determination of resource coordination is provided from the CCN to the member eNBs, the benefit metrics may not need to be signaled. That is, since the CCN functions to determine resource coordination in consideration of benefit metrics expected by the member eNBs, benefit metrics expected by the CCN do not need to be provided to the member eNBs. In the case that signaling transmitted from a member eNB to the CCN and signaling transmitted from the CCN to the member eNB are defined in an "integrated signaling format," which will be described later, the benefit metric information may be set to a special value indicating that the signaling is a notice/command type of resource coordination decision which the CCN transmits to the member eNB, may be omitted, or may be reserved.

Signaling of CoMP hypotheses and benefit metrics as above may be applied not only to the centralized coordination architecture but also to the distributed coordination architecture. For example, in the distributed coordination architecture, when eNB1 is a sender and eNB2 is a receiver, the benefit metric signaling may be understood as resource coordination request (or resource coordination recommendation) signaling given considering the indicated CoMP hypothesis in view of eNB1. In this case, eNB2 may consider information received from eNB1 in determining scheduling thereof. Specifically, eNB2 may consider that the information about operation of the transmitter eNB1 is guaranteed to be applied to eNB1 later. Accordingly, the receiver eNB2 may utilize a CSI feedback report of a relevant UE. The information about the operation of the receiver eNB2 may be considered when eNB2 operates in a best effort manner. In the distributed coordination architecture, lots of such signaling may be exchanged, and thus the receiver eNB2 may also consider information about operation of other eNBs in performing scheduling thereof. For example, the most commonly preferred CoMP hypothesis (i.e., a CoMP hypothesis to which a large number of eNBs has assigned a higher benefit metric value than to the other CoMP hypotheses) may be used as an assumption on final scheduling decision of the receiver eNB2.

3) CSI and RSRP Information

One or more sets of CSI information and/or RSRP information about a set of UEs may be Xn-signaled for CoMP operation in both the centralized coordination architecture and the distributed coordination architecture. The aforementioned cell-specific benefit metric does not include explicit UE-specific information such as CSI reported together with UE identification information (ID) and NW-CSI-process identification information (ID) assumed for the CSI, and therefore this type of information may be used for CoMP as additional information based on signaling of the benefit metric information. For example, in the case that CSI information including PMI of UEs to be scheduled by the transmitter eNB is provided to other eNBs, the receiver eNB may consider CoMP operation including coordinated beamforming (CB) based on the CSI information.

Since signaling of UE-specific information as above causes large overload for Xn-signaling between eNBs, element information such as QCI, buffer status and average user throughput may not be simultaneously Xn-signaled. Accordingly, the UE-specific signaling may be treated as supplementary or optional information.

4) Improved RNTP

Signaling of an improved RNTP is recognized as a notice of operation of the transmitter eNB related to power level and/or beamforming information of the transmitter eNB on an indicated frequency/time resource map, and thus the distributed coordination architecture may be supported by NIB CoMP. In contrast with existing RNTP/ABS (almost blank subframe) signaling, the resource configuration granularity is extended to the two-dimensional domain of a frequency-time resource map, multi-level power assignment information is indicated, and indication information (e.g., precoding information) in the space domain is included in signaling.

The improved RNTP may include a transmit power threshold and a frequency/time domain 2-dimensional bitmap. Each bit of the 2-dimensional bitmap may indicate that a power level below the threshold is or is not guaranteed. The resource configuration granularity may be defined as an RB unit in the frequency domain and as a subframe unit in the time domain. For a 2-dimensional resource map, bitmaps for K RBs and L subframes may be designed as a K-bit bitmap and an L-bit bitmap. In this case, the K-bit bitmap may be valid only in subframes indicated in the L-bit bitmap (e.g., subframes corresponding to bits set to 1). Using only one power threshold, rather than using multi-level power thresholds, may be sufficient.

Integrated Xn-Signaling

Signaling indicating a result/notice/request/recommendation/command for interference coordination mentioned in the description of "NW-CSI-IM Indication Information Indicating Resource Coordination Notice/Result" and "NW-CSI-IM Indication Information Indicating Resource Coordination Request" may be designed in one integrated Xn-signaling format. Hereinafter, the integrated signaling format will be referred to as a CoMP coordination CSI-IM map, namely CCC map. Table 11 represents an example of the CCC map.

TABLE 11

| IE/Group Name | Semantics description |
|---|---|
| CoMP Coordination CSI-IM map; CCC map | Per PRB (and/or per subframe index based on a subframe bitmap), NW-CSI-IM index(es) are listed, meaning the transmission assumption for the sender eNB (including transmitted power and/or precoding information) on the REs corresponding to the listed NW-CSI-IM indexes can be assumed the same on the indicated PRB (and/or subframe index), and the transmission assumptions for other eNBs within the CoMP cluster (including transmitted power and/or precoding information) on the REs corresponding to the listed NW-CSI-IM indexes are (highly) recommended to be assumed the same on the indicated PRB (and/or subframe index) |

The integrated CCC map as shown in Table 11 indicates operations of a sender eNB, a receiver eNB and other eNBs in a CoMP cluster all together. That is, in the CCC map, transmission assumption of each eNB (transmit power (including execution of muting) and/or precoding information) may be known from NW-CSI-IM index(es) information listed according to respective specific frequency/time resources. The transmission assumption on the transmitter eNB may be interpreted as meaning that the sender eNB will constantly maintain the transmission assumption thereof on the indicated frequency/time resource. Additionally or alternatively, the transmission assumption for the receiver eNB may be interpreted as meaning that the transmitter eNB (highly) recommends that the receiver eNB should constantly maintain the transmission assumption on the indicated frequency/time resource. Additionally or alternatively, the transmission assumption for other eNBs (i.e., the other eNBs in the CoMP cluster) may be interpreted as meaning that the transmitter eNB (highly) recommends that the corresponding eNBs should constantly maintain the transmission assumption on the indicated frequency/time resource.

Accordingly, the receiver eNB may assume that operations of other eNBs are very likely to be performed according to the CCC map, and perform final scheduling decision considering the corresponding CSI feedback information in scheduling a UE having performed CSI feedback reporting on the corresponding NW-CSI-IM index(es).

In the centralized coordination architecture, CCC map signaling as represented in the Table 11 may be defined or configured to be transmitted by only a specific eNB (e.g., the CCN or Marco-eNB). In this case, the receiver eNB may assume that operations of other eNBs will be performed according to the CCC map, and perform final scheduling decision considering the corresponding CSI feedback information in scheduling a UE having performed CSI feedback reporting on the corresponding NW-CSI-IM index(es).

In the case that a plurality of NW-CSI-IM indexes associated with a specific frequency/time resource is indicated and the transmission assumption for the receiver eNB (or other eNBs) differs between the indicated NW-CSI-IM indexes, operation of the receiver eNB (or other eNB) may be defined or configured to be interpreted as "don't care". Alternatively, in the case that three or more NW-CSI-IM indexes are indicated, operation of the receiver eNB (or other eNBs) may be defined or configured based on a larger number of indicated NW-CSI-IM indexes to which the same transmission assumption is indicated.

An integrated Xn-signaling format may be configured by including the utility metric (or preference rating, priority map, or benefit metric) information represented in Table 9 or 10 in the exemplary CCC map shown in the Table 11. An example of this configuration is represented in Table 12. The terms utility metric, preference rating, and priority map mentioned above will be collectively referred to as "benefit metric" in the examples described below.

transmitter eNB and additionally informing of how beneficial the CoMP hypothesis is to the transmitter eNB.

In the centralized coordination architecture, in the case that the transmitter eNB is a CCN or macro-eNB, the integrated signaling of Table 12 may be interpreted as transmitting a command/notice of an operation (i.e., a CoMP hypothesis) that the respective eNBs in the CoMP cluster need to maintain. Each of the eNBs receiving the signaling may apply the transmission assumption applied on NW-CSI-IM index(es) to the indicated frequency/time resource in the same manner. In this case, the "benefit metric" information of the integrated signaling format transmitted by the CCN does not maintain the original semantics, but may be utilized as a selector bit reserved (or not included) in the integrated signaling format or proposed in the present invention (e.g., in the case that the benefit metric information has a predetermined special value, the integrated signaling may function as a resource coordination command/notice. Otherwise, the benefit metric information may be used to identify signaling transmitted from member network nodes to the CCN). However, the scope of the present invention is not limited thereto. Information different from the benefit metric information may function as the selector bit in the integrated signaling format.

As integrated signaling which may be similar to and used in place of the integrated signaling (or CCC map) of Table 11 or 12, signaling of an improved RNTP/improved ABS type as represented in Table 13 below may be defined.

TABLE 13

| IE/Group Name | Semantics description |
|---|---|
| Enhanced RNTP (or Enhanced ABS) map | Per PRB (and/or per subframe index based on a subframe bitmap), Enhanced RNTP (or Enhanced ABS) map(s) are listed, where each enhanced RNTP (or Enhanced ABS) map consists of a (multi-level) RNTP (or Enhanced ABS or preference rating) value for each eNB (within an eNB group, e.g., CoMP cluster) |

Hereinafter, an example of the integrated signaling of Table 13 will be described with reference to FIG. 17.

TABLE 12

| IE/Group Name | Semantics description |
|---|---|
| CoMP Coordination CSI-IM map; CCC map | Per PRB (and/or per subframe index based on a subframe bitmap), pair(s) of {NW-CSI-IM index(es), benefit metric} are listed, meaning the transmission assumption for the sender eNB (including transmitted power and/or precoding information) on the REs corresponding to the listed NW-CSI-IM indexes can be assumed the same on the indicated PRB (and/or subframe index), and the transmission assumptions for other eNBs within the CoMP cluster (including transmitted power and/or precoding information) on the REs corresponding to the listed NW-CSI-IM indexes are (highly) recommended to be assumed the same on the indicated PRB (and/or subframe index) |

Description of Table 11 may be applied to Table 12. Additionally, "benefit metric" information may be provided according to indicated NW-CSI-IM index(es) as well.

In the distributed coordination architecture, the integrated signaling of Table 12 may be interpreted as informing of operations (i.e., a CoMP hypothesis) of the respective eNBs in a CoMP cluster which are recommended or desired by the FIG. 17 illustrates an improved RNTP map (or improved ABS map) signaled with respect to a frequency/time resource according to an embodiment of the present invention.

For example, suppose that eNB1 is the sender eNB, and eNB2 is the receiver eNB. In FIG. 17, the value M1 is interpreted as meaning that eNB1 sends a notice indicating that the power assignment thereof does not exceed the value M1. Value M2 is interpreted as meaning that eNB1 recommends to eNB2 that power assignment of eNB2 not exceed the value M2. Values M3, M4, and the like are interpreted as meaning that eNB1 recommends to other eNBs that power assignment of other eNBs (eNB3, eNB4, . . . ) should not exceed the corresponding values (M3, M4, . . . ) and that the receiver eNB2 performs scheduling thereof assuming that other eNBs will operate according to the recommended power assignment values.

In addition, in FIG. 17, candidate values or ranges which may be set to power assignment values M1, M2, M3, M4, . . . etc. may be predefined or preset. For example, a possible range of power assignment values may be between P_min and P_max, and each value means a maximum power threshold value (i.e., indicating one value within the range means power assignment not exceeding the indicated value). Indicating 0 as the power assignment threshold value (e.g., predefining and indicating P_min=0) may mean that muting is performed.

The improved RNTP or improved ABS shown in FIG. 17 extends conventional signaling of RNTP or ABS to multi-level signaling, and includes not only information about the power assignment of the transmitter eNB but also a recommendation/request of power assignment for other eNBs.

In the examples of the present invention described above, identification of specific eNBs such as eNB1, eNB2, eNB3, . . . , etc. may be predefined or preconfigured in the form of a specific eNB set such as the CoMP cluster. Accordingly, eNBs for which the values M1, M2, . . . of FIG. 17 are intended may be predefined, or an identifier indicating an eNB for which each power assignment value is intended (e.g., a cell ID of a corresponding eNB) may be signaled together with a power assignment value with which the identifier is paired.

In addition, in the examples of the present invention described above, in order to more clearly indicate that various interpretations as above are applicable to the integrated signaling, a predetermined selector may be defined. That is, the semantics by which the integrated signaling is to be interpreted may be announced by a value of the selector bit.

In the examples described above, Xn-signaling shown in Table 13 may be limited to be transmittable by only a specific eNB (e.g., the CCN or Macro-eNB) in the centralized coordination architecture.

In addition, an integrated signaling format configured by including benefit metric information of Table 12 in the example of Table 13 may be defined as represented in Table 14 below.

TABLE 14

| IE/Group Name | Semantics description |
| --- | --- |
| Enhanced RNTP (or Enhanced ABS) map | Per PRB (and/or per subframe index based on a subframe bitmap), pair(s) of {Enhanced RNTP (or Enhanced ABS) map(s), benefit metric} are listed, where each enhanced RNTP (or ABS) map consists of a (multi-level) RNTP (or ABS) value for each eNB (within an eNB group, e.g., CoMP cluster) |

Table 15 below represents an example of an integrated normal signaling format, which is a generalization of the examples of Tables 7 to 14.

TABLE 15

| IE/Group Name | Semantics description |
| --- | --- |
| Feature-integrated backhaul signalling (FIBS) | {application type, resource map (ABS or frequency/time map), associated parameter set} are listed, where "application type" will select (at least) one of the following applications - {eICIC, CoMP, eIMTA, NAICS, . . .}, and "resource map" is a predefined form, e.g., ABS subframe (bitmap), frequency/time map, etc., and "associated parameter set" is specifically defined based on each application type. |

In Table 15, for the resource map, an enhanced inter-cell interference coordination (eICIC) ABS pattern signaling format (e.g., a 40-bit ABS pattern designed for eICIC) may be reused.

In addition, in the case that the application type is CoMP, the "associated parameter set" may be configured in the form of a list of one or more elements from a set of {NW-CSI-IM index(es), NW-CSI-RS index(es), NW-CSI-process index(es), improved RNTP map(s) (or improved ABS map(s)), benefit metric (or utility metric, preference rating, priority map), precoding information containing a beam direction/coefficient, parameters (e.g., CSI report, RSRP, SRS power, UPT, PF metric, QCI) used for NIB CoMP operation}.

For other application types such as the eICIC, enhanced interference mitigation & traffic adaptation (eIMTA), and network-assisted interference cancellation and suppression (NAICS), a parameter set including one or more of parameters (e.g., the CoMP application type-related parameters, precoding information, multi-level power information, and modulation order information) associated with the application may be configured or indicated.

For example, in the case that the "application type" is CoMP or eICIC, the "associated parameter set" may include a CSI measurement parameter and CSI-IM mapping-related information.

In the case that the "application type" is NAICS, the "associated parameter set" may include a modulation order, CFI, PMI, RI, MCS, resource allocation, DMRS port, nDMRSID, transmission mode (TM), and RS configuration information. In addition, for NAICS, the associated parameters may be interpreted as information applied for an indicated frequency/time resource map.

The "application type" information may also be indicated by a predetermined index (e.g., 00, 01 , . . . ), and the information to be included in the "associated parameter set" may be indicated according to the index value. Alternatively, the "application type" information may be defined as being optional. In this case, information to be included in the "associated parameter set" or how the set is to be interpreted may be set to a default. Alternatively, a specific "application type" (or a specific index indicating the application type) may be defined or configured to be implicitly indicated according to the information configuration type of the "associated parameter set".

For the Xn-signaling formats proposed in the examples described above, formats for higher layer signaling (e.g., RRC signaling) exchanged between an eNB and a UE may also be applied. For example, when the UE receives RRC signaling, the UE may recognize an operation (or transmission assumption) of eNBs in a CoMP cluster, and perform CoMP reception considering the recognized operation.

Additional Example 2 of NIB CoMP Signaling Between eNBs

The following information may be signaled on an Xn interface (e.g., X2 interface) between eNBs NIB CoMP:
  One or more sets of CSI reports (RI, PMI, CQI) on individual UEs;
  One or more measurement reports (RSRP) on individual UEs;
  SRS reception power for individual UEs;
  User perceived throughput (UPT) for individual UEs;
  Resource usage information according to each cell;
  PF metrics for individual UEs;
  Information of an improved RNTP type defined in the frequency/time/power/space domain;
  Improved ABS information defined in the power and space domain;
  QCI;
  Indication of a resource coordination result or resource coordination request (resource allocation in the frequency/time/power/space domain);
  Information indicating configurations used for a reference signal, CSI process and CSI-IM configuration;
  Information indicating a coordination result or coordination request for a reference signal configuration, CSI process and CSI-IM configuration.

Preconditions for CoMP

To perform NIB CoMP operation, information on predetermined preconditions (e.g., information on configurations used for a reference signal, CSI process and CSI-IM configuration) needs to be provided in a CoMP cluster. Although the reference signal configuration, CSI process and CSI-IM configuration are provided to a UE through UE-dedicated RRC signaling, CSI-RS and CSI-IM configurations are preferably pre-subjected to network-wise (NW) coordination by O&M (operation and maintenance) or backhaul signaling support. For example, an NW CSI-IM index set may be predefined in the CoMP cluster and indicate muting/non-muting or "don't care" operation of each eNB on each CSI-IM resource. In addition, some of the indexes of the NW CSI-IM index set may be selected and configured for a UE associated with a corresponding eNB through RRC signaling by the eNB signaling.

To raise flexibility for operation of individual eNBs according to each CSI-IM resource, multi-level power assignment and/or precoding information configuration for CB, for example, may be signaled in the CoMP cluster. Similar to the example of CSI-IM, an NW RS configuration index, and an NW CSI process configuration index may be configured in the CoMP cluster.

Integrated Signaling for Resource Coordination

Considering that the kinds of information necessary for NIB CoMP resource coordination have a common purpose (e.g., resource coordination request/recommendation in the CoMP cluster or a resource coordination result/notice), signaling of the information is preferably simplified and unified.

The resource coordination request/recommendation provides element information for CoMP scheduling from a member eNB to a CCN, and may include, for example, one or more sets of CSI reports (RI, PMI, CQI) on individual UEs, one or more measurement reports (RSRP) on individual UEs, SRS reception power for individual UEs, UPT for individual UEs, resource usage information according to each cell, QCI, PF metrics for individual UEs, indication of a resource coordination request (resource allocation in the frequency/time/power/space domain), indication of a coordination request for a reference signal configuration/CSI process/CSI-IM configuration.

The resource coordination result/notice is to send a notice of a coordination result from the CCN to member eNBs and may include, for example, indication of a resource coordination result (resource allocation in the frequency/time/power/space domain) and indication of a coordination result for a reference signal configuration/CSI process/CSI-IM configuration.

Between the two types of signaling as above, signaling for resource coordination request/recommendation preferably defines an integrated signaling format rather than defining various different signaling formats.

In addition, the information about the "individual UEs" may not necessarily be shared in a cluster. Instead, in view of the transmitter eNB, it may be more efficient for the information to include information about "a UE to be scheduled" on the specific frequency/time resource map. Each eNB performs final scheduling decision (i.e., final determination of a UE to be scheduled) on its own. Sharing information about all possible UEs to be scheduled of an eNB with other eNBs may cause unnecessary overhead for information exchange, and thus sharing only information about best (or representative) UEs is sufficient.

In the centralized coordination architecture, information such as CSI report information, RSRP, SRS power, UPT, and QCI for each UE may not be necessarily needed. It may be only needed to share a preference rating value (utility metric, PF metric, or benefit metric) for best or representative UEs to be scheduled according to each frequency/time resource. This is because sharing information in the CoMP cluster is intended for resource coordination between eNBs, not for final scheduling determination of individual eNBs. Accordingly, a simplified preference rating value (or benefit metric value) may be used.

Simplified preference rating information (or benefit metric information) about a specific frequency/time resource map is preferably signaled together with an indication of an assumed CoMP hypothesis. Herein, the CoMP hypothesis is an assumption on operation of eNBs in the CoMP cluster (e.g., eNB1 performs muting, and eNB2 does not perform muting), and may be expressed in a simple form using a predefined NW-CSI-IM index or an explicit power assignment list for individual eNBs.

FIG. 18 is a diagram for describing a benefit metric signaled together with a CoMP hypothesis for a frequency/time resource map according to an embodiment of the present invention.

In FIG. 18, the CoMP hypothesis may be indicated by a power assignment list for individual eNBs. The power assignment list may be configured to explicitly indicate the power assignment value for eNB1, the power assignment value for eNB2, and the power assignment value for eNB N. Alternatively, the CoMP hypothesis may be indicated in a simpler form such as an NW CSI-IM index. That is, one index value may indicate operation of individual eNBs.

The preference rating value may be defined as an integer between 0 and L (L>0). For example, L may be set to 100. The preference rating value may be expressed as a level of preference in consideration of a scheduling benefit which the transmitter eNB expects assuming that the indicated CoMP hypothesis is applied. Alternatively, the benefit metric value described in FIG. 18 may be applied in place of the preference rating value.

Hereinafter, interpretation of an example of the integrated signaling format of FIG. 18 will be described.

In the centralized coordination architecture, in the case that the transmitter eNB is not the CCN but a member eNB, the integrated signaling of FIG. 18 is interpreted as indicating a resource coordination request/recommendation in view of the member eNB. Accordingly, the CCN may perform coordination decision based on all information provided from member eNBs. Each member eNB may provide a plurality of signals, and each signal may include information indicating a different preference rating value (or benefit metric value) for a different CoMP hypothesis (hypothesis for operations of the sender eNB and other eNBs).

In the case that the transmitter eNB is the CCN in the centralized coordination architecture, the integrated signaling of FIG. 18 is interpreted as indicating a resource coordination result/notice determined by the CCN, and all member eNBs receiving the signaling conform to details of the notice. Specifically, each receiver eNB needs to maintain operation on the indicated frequency/time resource with the same details (e.g., the transmit power value, whether to perform muting, precoding, etc.) of operation on a CSI-IM resource indicated by an NW-CSI-IM index indicating the CoMP hypothesis assumed in FIG. 18. Only in this case, may each eNB make a final UE scheduling decision thereof on the indicated frequency/time resource by directly applying the latest CSI feedback report of the UE based on the corresponding CSI-IM resource on the assumption that operation of other eNBs is guaranteed as indicated. In addition, according to this method, each eNB may select a type of a signal transmitted on the CSI-IM resource without restriction. Accordingly, the CB type CoMP technique may be utilized on the NIB condition.

In FIG. 18, for a format in which an explicit power assignment list of individual eNBs (identified by cell ID indications of individual eNBs), the transmit power of a corresponding eNB on the indicated frequency/time resource should not exceed a value indicated as the power threshold value of the eNB. The power threshold may be set to different levels. In the case that the corresponding signaling is transmitted from the CCN, this may be interpreted as improved RNTP/ABS signaling including operation of a plurality of eNBs.

In the case that the transmitter eNB of the format of FIG. 18 is a CCN, the preference rating information (or benefit metric information) may be omitted or set to a fixed value. This is because signaling from the CCN in the centralized coordination architecture is interpreted as a resource coordination result/notice. That is, since the CCN functions to perform resource coordination decision in consideration of preference rating information (or benefit metric information) which the member eNB expects, preference rating information (or benefit metric information) that the CCN expects does not need to be provided to the member eNB. In the case that signaling transmitted from the member eNB to the CCN and signaling transmitted from the CCN to the member eNB are defined in an integrated signaling format as in this embodiment, the preference rating information (or benefit metric information) may be set to a fixed/special value indicating that the signaling is the type of a notice/command of the resource coordination decision that the CCN transmits to the member eNB, may be omitted, or may be reserved.

For the integrated signaling of FIG. 18, in the distributed coordination architecture, most of the description given above of the case where the transmitter eNB is not the CCN in the centralized coordination architecture may be applied. For example, in the case that the transmitter is eNB1 and the receiver is eNB2, the integrated signaling of FIG. 18 is interpreted as a resource coordination request/recommendation including the preference rating value of eNB1 from eNB1. The receiver eNB2 may consider the received information for scheduling decision thereof.

Specifically, eNB2 may consider that the information about operation of the transmitter eNB1 is guaranteed to be applied to eNB1 later. Accordingly, the receiver eNB2 may utilize a CSI feedback report of a relevant UE. The information about the operation of the receiver eNB2 may be considered when eNB2 operates in the best effort manner. In the distributed coordination architecture, lots of such signaling may be exchanged, and thus the receiver eNB2 may also consider information about operation of other eNBs in performing scheduling thereof. For example, the most commonly preferred CoMP hypothesis (i.e., a CoMP hypothesis to which a large number of eNBs has assigned a higher preference rating value than to the other CoMP hypotheses) may be used as an assumption on final scheduling decision of the receiver eNB2.

Signaling Applied to Distributed Coordination Architecture

In the distributed coordination architecture, improved RNTP-type information (e.g., a frequency/time/power/space domain) and improved ABS information (e.g., a power/space domain) may be signaled. Such information is recognized as a notice of operation of the sender eNB related to the power level and/or beamforming information of the transmitter eNB on an indicated frequency/time resource.

In contrast with existing RNTP/ABS (almost blank subframe) signaling, the resource configuration granularity is extended to the two-dimensional domain of a frequency-time resource map, multi-level power assignment information is indicated, and indication information (e.g., precoding information) in the space domain is included in signaling.

The integrated signaling format of FIG. 18 may be applied to both the centralized coordination architecture (e.g., the transmitter eNB is not the CCN) and the distributed coordination architecture and used to notify of operation of the transmitter eNB. Accordingly, the integrated signaling may also include improved RNTP/ABS signaling. The integrated signaling format of FIG. 18 may also be used to request/recommend operation of other eNBs. Accordingly, the improved RNTP/ABS type information may be viewed as signaling for subset information of the integrated signaling format. That is, an information element for the preference rating value and/or an information element requesting/recommending operation of other eNBs in the integrated signaling of FIG. 18 are designed as optional elements, a flexible signaling format allowing the network operator to be used both in the centralized coordination architecture and the distributed coordination architecture may be defined.

However, in the case that signaling applied to only the distributed coordination architecture is introduced, the improved RNTP/ABS type information signaling may be separately defined, and the integrated signaling format as shown in FIG. 18 may be defined as properly supporting the centralized coordination architecture of NIB CoMP.

In this case, status report signaling (i.e., feedback information from the receiver eNB) about usage on the indicated frequency/time resource may be needed. For example, a feedback report on how much of the information indicated by the transmitter eNB is used for non-CoMP UE and CoMP UE scheduling is used may be sent. Similar to the existing ABS status report, the feedback information may be used when each eNB determines the next backhaul signaling in consideration of feedback information from other eNBs.

Configuration of CoMP Hypothesis and Benefit Metric Signaling Period

As an additional example of a configuration granularity and rate of a CoMP hypothesis, a CoMP hypothesis signaling period (i.e., T ms) may be set in consideration of feedback periods set for individual UEs. For example, the T value may not be predefined, but may be determined and signaled (along with signaling of a CoMP hypothesis and benefit metric or separately) by the transmitter eNB. In the case that the value of T is delivered every time the transmitter eNB transmits signaling including a CoMP hypothesis and benefit metric (or once per a plurality of signals), this may indicate that every time the value of T changes, signaling including the CoMP hypothesis and benefit metric is transmitted with the changed periodicity of T ms. That is, in the case that the value of T is not included, this may indicate that the value of T as previously signaled is applied. For example, in the case that a changed value T2 is signaled after a value T1 is signaled, this means that signaling including a CoMP hypothesis and benefit metric is transmitted according to a period T2 until another changed value T3 is signaled.

Alternatively, the period T of signaling including a CoMP hypothesis and benefit metric may be signaled as requested/designated by the receiver eNB. This may mean that the receiver eNB signals a desired period of receiving signaling including a CoMP hypothesis and benefit metric. Accordingly, the transmitter eNB may transmit signaling in consideration of such value of T. Alternatively, the transmitter eNB may not need to reflect the value T1 desired by the receiver eNB. Instead, the transmitter eNB may transmit signaling according to period T2 which the transmitter eNB desires in consideration of the value T1. In the case that signaling is transmitted according to period T2 different from the value T1 desired by the receiver eNB, information about the signaling period T2 may be transmitted to the receiver eNB.

In a situation in which signaling including a CoMP hypothesis, CSI information set and benefit metric is transmitted according to period T, the CSI information set includes information about a set of UEs, and the UEs included in the set of UEs may change at every signaling transmission time. This is because each UE may have a different feedback period. For example, in the case that the feedback period of UE1 is 5 ms, and the feedback period of UE2 is 10 ms, signaling including the CSI information set may be transmitted with T set to 5 ms. Accordingly, a "set of UEs" related to a CSI information set at a specific transmission time may include only UE1, and a "set of UEs" related to CSI information set at the next transmission time after 5 ms may include only UE2.

CoMP Information Signaling Between eNBs

Hereinafter, a method of signaling CoMP information between eNBs will be described in order to support the CoMP operation based on the Non-Ideal Backhaul.

The CoMP between eNBs will be mainly described below as an example, the principle of the present invention Description below is mainly focused on CoMP operation between eNBs, but the principle of the present invention may also be applied to CoMP operation between MeNBs, SeNBs, Transmission Points (TPs), Reception Points (RPs), remote radio heads (RRHs), and relays. Hereinafter, for convenience of description, the nodes will be collectively described, however, it is understood that any of the terms eNB, MeNB, SeNB, TP, RP, RRH and relay encompasses all of the other terms.

As described above, a coordination architecture having no central control node (CCN) to control multiple eNBs participating in the CoMP operation may be called a distributed coordination architecture and a coordination architecture having a CCN may be called a centralized coordination architecture.

For example, a CCN may be one of a plurality of eNBs that participates in the CoMP or other entity (e.g., MME, a new node that is not defined in 3GPP LTE/LTE-A; hereinafter, referred to as a 'Central node') except a plurality of eNBs that participates in the CoMP. In addition, in the case that an MeNB and an SeNB support the CoMP operation, the CCN may be the MeNB, and in the case that a plurality of SeNBs supports the CoMP operation, the CCN may be the MeNB or one of a plurality of SeNBs.

Hereinafter, for clarity of description, a signaling between specific eNBs is simply described in various examples of the present invention. The signaling between specific eNBs may refer to the signaling between specific eNBs of the distributed coordination architecture or the signaling between a CCN and a member eNB of the centralized coordination architecture.

Herein, the signaling between eNBs may be transmitted on the link (e.g., X2 link/backhaul link) which is connected through Xn interface.

A CoMP information Information Element (IE) provides a list of CoMP Hypothesis set(s). Each CoMP Hypothesis set is a collection of one or more CoMP Hypotheses. And, each CoMP Hypothesis set is in relation to one benefit metric.

The CoMP Information IE includes one or more CoMP Information Item IEs. The CoMP Information Item IE includes a CoMP Hypothesis Set IE and a Benefic Metric IE.

The CoMP Hypothesis Set IE provides a set of CoMP Hypothesis. The CoMP Hypothesis is hypothetical PRB-specific resource allocation information for a cell.

The Benefic Metric IE is in relation to one or more CoMP Hypotheses (i.e., CoMP Hypothesis Set), and means a value of quantifying a benefit which is anticipated when scheduling according to the CoMP Hypothesis (Hypotheses) in the corresponding cell when the related CoMP Hypothesis (Hypotheses) is (are) assumed.

The CoMP Hypothesis Set IE includes one or more CoMP Hypothesis Set Element IEs. The CoMP Hypothesis Set Element IE includes a cell ID IE and a CoMP Hypothesis IE.

The CoMP Hypothesis IE may have a granularity of one or multiple subframe unit in the time domain and a physical resource block (PRB) unit in the frequency domain. That is, the CoMP Hypothesis IE may include two dimensional bitmaps that have a subframe unit in the time domain and a PRB unit in the frequency domain.

In the CoMP Hypothesis IE, the bit string corresponding to a system bandwidth (e.g., 6 bits in the case that the system bandwidth is 6 RBs and 110 bits in the case that the system bandwidth is 110 RBs) may be repeated as much as the maximum subframe numbers. In the case that the minimum system bandwidth is 6 RBs, in order to indicate the resource allocation information for 6 RBs in a subframe, the minimum bit of the CoMP Hypothesis IE may be 6 bits.

Each bit of the CoMP Hypothesis IE indicates the resource allocation information for the PRB in a subframe. For example, each bit of the CoMP Hypothesis IE indicates 'muting' in the corresponding PRB when a bit value in a specific position of a bitmap is 1, and indicates scheduling in the corresponding PRB (i.e., 'non-muting') or 'unlimited' (i.e., arbitrarily determined to be scheduling or muting in a receiver node) when the bit value is 0.

In the case of the centralized coordination architecture, the CoMP Information IE may be used for a CCN to forward the command for a global optimization coordination decision to a member eNB.

For example, in order for a CCN to obtain the maximum gain in the global aspect of the eNB clusters that participate in the CoMP operation, a part of the member eNBs may command 'muting' in a specific resource position.

The CoMP Hypothesis Set Element IE indicates resource allocation information in the PRB unit with respect to a specific cell. A member eNB may identify the Cell ID information included in the CoMP Hypothesis Set Element IE received, and in the case of its own Cell ID, perform muting or scheduling according to the resource allocation information indicated by the bitmap.

However, since the CoMP operation according to the present invention operates based on the Non-Ideal Backhaul, even in the case that a CCN forwards a CoMP information IE to a plurality of member eNBs simultaneously, the transmission delay time between a member eNB and the CCN may be different for each member eNB. And the transmission delay time between a member eNB and the CCN may be different every time for the same member eNB. Accordingly, it is required to clearly notice the time when the resource allocation information (i.e., CoMP Hypothesis Set Element IE) for a specific cell included in the CoMP Information IE transmitted by the CCN is applied to each member eNB.

In addition, the CoMP Information IE may be used for notifying the information about an anticipated benefit for a cell when assuming that a member eNB schedules at a specific resource position such that a CCN is able to perform the global optimization coordination decision. That is, each member eNB may construct the resource allocation information (i.e., CoMP Hypothesis Set) for each PRB in its own aspect, and calculate and notify the benefit owned by the member eNB itself when allocating resource as such to the CCN.

As such, when each member eNB transmits the CoMP Information IE to a CCN, the Benefit Metric IE for each CoMP Hypothesis Set IE is meaningful. However, when a CCN transmits the CoMP Information IE to each member eNB, the Benefit Metric IE may be meaningless. Accordingly, when a CCN transmits the Benefit Metric IE, it is required to configure a specific value for the Benefit Metric IE.

In addition, the signaling of a CoMP Information IE may be either periodically transmitted or aperiodically transmitted. For both of the cases that the CoMP Information IE is periodically transmitted and aperiodically transmitted, a transmission time may be determined by all transmitter nodes. However, in the case that each member eNB signaling a CoMP Information IE by determining a transmission time as such, a CCN receives the CoMP Information IE on different times from each member eNB in the aspect of the CCN, and thus, the performance of the CoMP operation may be degraded. Accordingly, in the aspect of the CCN, it is required for the CCN to transmit the CoMP Information IE on the same time to each member eNB or to anticipate on which time a specific member eNB transmits the CoMP Information IE.

Accordingly, in the present invention, the CoMP Information IE, the CoMP Hypothesis Set IE and the Benefit Metric IE are defined, and based on this, a method of signaling between eNBs is proposed for supporting the CoMP operation based on the Non-Ideal Backhaul between eNBs.

FIG. 19 is a diagram illustrating a method of signaling between eNBs for supporting the CoMP operation according to an embodiment of the present invention.

In the distributed coordination architecture, a first node may correspond to a first eNB and a second node may correspond to a second eNB. In this case, the first node and the second node may be connected through Xn (e.g., X2) interface.

On the other hand, in the centralized coordination architecture, a first node may correspond to a CCN and a second node may correspond to a member eNB. In addition, on the contrary, a first node may correspond to a member eNB and a second node may correspond to a CCN.

As described above, a CCN may be one of a plurality of eNBs that participates in the CoMP. In this case, a first node may correspond to a first eNB and a second node may correspond to a second eNB. In this case, the first node and the second node may be connected through Xn (e.g., X2) interface.

In addition, a CCN may be different entity from a plurality of eNBs that participates in the CoMP.

For example, when a CCN is an MME, the first node may correspond to the MME and the second node may correspond to a member eNB that participates in the CoMP. In addition, on the contrary, the first node may correspond to a member eNB and the second node may correspond to the MME. In this case, the first node and the second node may be connected through S1 interface.

As another example, in the case that a CCN is a central node which is not defined in the 3GPP LTE/LTE-A system, the first node may correspond to a central node and the second node may correspond to a member eNB that participates in the CoMP. In addition, on the contrary, the first node may correspond to a member eNB and the second node may correspond to a central node. In this case, the first node and the second node may be connected through a newly defined interface (e.g., C1 interface).

Referring to FIG. 19, the first node transmits a CoMP Information IE to the second node (step, S1901).

Herein, in the case that the CoMP Information IE is transmitted through X2 interface, the CoMP Information IE may be transmitted with being included in a Load Information message (or IE).

In describing the CoMP Information IE in more detail, the CoMP Information IE may be constructed as represented in Table 16 below.

Table 16 represents the CoMP Information IE according to an embodiment of the present invention.

TABLE 16

| IE/Group Name | Presence | Range | IE type and reference | Semantics description |
|---|---|---|---|---|
| CoMP Information Item | | 1 ... <maxnoofCoMPInformation> | | |
| >CoMP Hypothesis Set | M | | Table 18 | |
| >Benefit Metric | M | | Table 20 | |
| >Periodicity | O | | ENUMERATED {5, 10, 20, 40, 80 ms} | Recommended periodicity for the receiver node when sending (back) this IE |

TABLE 16-continued

| IE/Group Name | Presence | Range | IE type and reference | Semantics description |
|---|---|---|---|---|
| >Starting SFN | O | | INTEGER(0 ... 1023, ... ) | Included if specific value (e.g. 0) is set for all the values in the Benefit Metric IE |
| >Starting Subframe Index | O | | INTEGER(0 ... 9, ... ) | Included if specific value (e.g. 0) is set for all the values in the Benefit Metric IE |

Referring to Table 16, the IE/Group Name represents the name of an IE or an IE group. Hereinafter, for the convenience of description, the IE and the IE group will be described as a common name.

'M' of the Presence field is a mandatory IE and represents an IE that is always included in a message, 'O' is an optional IE and represents an IE that may be included or not be included in a massage. And, 'C' is a conditional IE and represents an IE that is included only when a specific condition is satisfied.

The Range field represents the number in which an IE is repeated.

The semantics description field is a field for describing the corresponding IE.

The CoMP Information IE will be described as below.

The CoMP Information Item IE may be included in the CoMP Information IE as much as up to the number of 'maxnoofCoMPInformation'.

The CoMP Information Item IE may include one or more IEs among a CoMP Hypothesis Set IE, a Benefic Metric IE, a Periodicity IE, a Starting SFN IE and a Starting Subframe Index IE. In other words, one or more IE may be excluded and the CoMP Information Item IE may be configured.

Detailed description for the CoMP Hypothesis Set IE and the Benefic Metric IE are as follows.

The Periodicity IE represents a transmission period of the CoMP Information IE proposed by a transmitter node when a receiver node transmits the CoMP Information IE. That is, the Periodicity IE represents a transmission period of the CoMP Information IE of a receiver node proposed by a transmitter node. For example, the transmission period may be one of 5, 10, 20, 40 or 80 ms.

The Periodicity IE is an optional IE and may be included or not included in the CoMP Information IE.

For example, in the case of the centralized coordination architecture, the Periodicity IE may be included when a CCN transmits a CoMP Information IE to a member eNB that participates in the CoMP operation. On the contrary, the Periodicity IE may not be included when a member eNB that participates in the CoMP operation transmits a CoMP Information IE to a CCN.

In other words, the Periodicity IE may be included in a CoMP Information IE only in the case that all values of a Benefic Metric IE are set to a specific value (e.g., 0). Otherwise, the Periodicity IE may not be included in a CoMP Information IE.

As described above, a transmitter node needs to notify an applying time to a receiver node when a receiver node should apply the CoMP Hypothesis Set IE (i.e., muting/non-muting resource pattern) included in the CoMP Information IE accurately.

This is because the backhaul delay between a transmitter node and a receiver node may be different for each receiver node, and the operation of multiple receiver nodes that participate in the CoMP operation is required to be accurately aligned. Otherwise, owing to different backhaul delay, each receiver node may apply the muting pattern indicated by a CCN on different timings. When the case is occurred, the CoMP performance may be significantly degraded.

The applying time of the CoMP Information IE may be configured by a System Frame Number (SFN) and a subframe index as represented in Table 16.

The Starting SFN IE indicates an SFN of the radio frame that includes the valid first subframe of the CoMP Information IE. In other words, the Starting SFN IE indicates the first (starting) system frame number to which the CoMP Information IE is applied.

The Starting SFN IE may be indicated by an integer value, and may be expressed as 0 to 1023 or more integer values, for example.

The Starting SFN IE is an optional IE and may be or may not be included in the CoMP Information IE.

For example, the Starting SFN IE may be included in the CoMP Information IE only in the case that all values of the Benefic Metric IE are set to a specific value (e.g., 0). Otherwise, the Starting SFN IE may not be included in the CoMP Information IE.

The Starting Subframe Index (or the Starting Subframe Number) IE indicates the number of the first subframe in which the CoMP Information IE in the radio frame indicated by the Starting SFN IE is valid. In other words, the Starting Subframe Index IE indicates the first subframe to which the CoMP Information IE is applied. The Starting Subframe Index IE may be indicated as an integer value, and may be expressed as 0 to 9 or more integer values, for example.

Like the Starting SFN IE described above, the Starting Subframe Index IE is an optional IE and may be or may not be included in the CoMP Information IE. That is, the transmitter node that transmits the CoMP Information IE may determine whether the Starting Subframe Index IE is included.

In addition, the Starting SFN IE/Starting Subframe Index IE may be transmitted with being included in the CoMP Information IE only in the case that the Benefit Metric value is a specific special value (e.g., a specific form that may be indicated as a dummy value or "no weight" such as 0).

Otherwise, in the case that the Benefit Metric value is transmitted with being mapped to valid values, not mapped to a specific value, there may be a constraint condition that the Starting SFN IE/Starting Subframe Index IE are not transmitted at the same time.

This is because, for example, the Starting SFN IE/Starting Subframe Index IE may be the information that is meaningful only when it is transmitted by a CCN. That is, when member eNBs provide the information to the CCN, since the member eNBs already calculate the information such as the Benefit Metric and the like based on the latest scheduling related information (e.g., the CSI feedback from UEs, an average throughput for each UE, a buffer state, and so on), it is enough to transmit the latest information to the CCN. And it is not required to provide additional information that the information "should be used from a specific time", and there is no ground of calculating such additional information.

Accordingly, as represented in Table 16, when a CCN transmits a CoMP Information IE to the eNB that participates in the CoMP operation, all values of the Benefit Metric IE may be set to a specific value (e.g., 0), and the Starting SFN IE may be included in the CoMP Information IE. On the contrary, when the eNB that participates in the CoMP operation transmits a CoMP Information IE to a CCN, the Starting SFN IE may not be included in the CoMP Information IE since the benefit value calculated by the corresponding member eNB is included in the Benefit Metric IE.

Similarly, when a CCN transmits a CoMP Information IE to the eNB that participates in the CoMP operation, all values of the Benefit Metric IE may be set to a specific value (e.g., 0), and the Starting Subframe Index IE may be included in the CoMP Information IE. On the contrary, when the eNB that participates in the CoMP operation transmits a CoMP Information IE to a CCN, the Starting Subframe Index IE may be included in the CoMP Information IE since the benefit value calculated by the corresponding member eNB is included in the Benefit Metric IE.

Table 17 represents a range of the CoMP Information Item IE exemplified in Table 16 above.

TABLE 17

| Range bound | Explanation |
| --- | --- |
| maxnoofCoMPInformation | Maximum number of CoMP Hypothesis sets. The value is 4. |

Referring to Table 16 and Table 17, up to four CoMP Information Item IEs may be included in one CoMP Information IE. That is, up to four types of CoMP hypothesis set information may be included in each CoMP Information IE.

The maxnoofCoMPInformation value (i.e., 4) exemplified in Table 17 is just an example, and the present invention is not limited thereto.

The CoMP Hypothesis Set IE may be configured as Table 18 below.

Table 18 exemplifies a CoMP Hypothesis Set IE according to an embodiment of the present invention.

TABLE 18

| IE/Group Name | Presence | Range | IE type and reference | Semantics description |
| --- | --- | --- | --- | --- |
| CoMP Hypothesis Set Element | | 1 ... <maxnoofCoMPCells> | | |
| > Cell ID | M | | ECGI 9.2.14 | ID of the cell for which the CoMP Hypothesis IE is applied. |
| > Subframe | | 1 ... <maxSubframes> | | |
| >> RB | | 1 ... <maxRBs> | | |

TABLE 18-continued

| IE/Group Name | Presence | Range | IE type and reference | Semantics description |
| --- | --- | --- | --- | --- |
| >>> CoMP Hypothesis | M | | ENUMERATED (0, 1, ...) | Value '0' indicates 'no Tx power', and Value '1' indicates otherwise. |

In Table 18, the description for each field is the same as those of Table 16 above, the description will be omitted.

The CoMP Hypothesis Set Element IE may be included up to the number of 'maxnoofCoMPCells' in the CoMP Hypothesis Set IE.

The CoMP Hypothesis Set Element IE includes a Cell ID IE and a Subframe IE.

The Cell ID IE indicates an identifier of a cell to which the corresponding CoMP Hypothesis Set Element IE is applied.

The Subframe IE indicates a subframe to which the corresponding CoMP Hypothesis Set Element IE is applied. The Subframe IE may be included in the CoMP Hypothesis Set Element IE as much as up to the number of 'maxSubframes'.

The Subframe IE includes an RB IE.

The RB IE indicates an RB to which the corresponding CoMP Hypothesis Set Element IE is applied. The RB IE may be included in the Subframe IE as much as up to the number of 'maxRBs'.

The RB IE includes a CoMP Hypothesis IE.

The CoMP Hypothesis IE may have a value of 0, 1 or the like, for example. In the case that the CoMP Hypothesis IE is set to 0, the CoMP Hypothesis IE indicates 'no Tx power (i.e., muting)', and in the case that the CoMP Hypothesis IE is set to 1, the CoMP Hypothesis IE indicates 'there is Tx power (i.e., non-muting/scheduling)'.

Assuming that the CoMP Hypothesis IE indicates only '0' or '1', the CoMP Hypothesis IE indicates the presence of the transmission power for each RB included in the RB IE. Since the RB IE is included for each Subframe IE, consequently, two-dimensional resource allocation information is indicated in the frequency-time domain.

In addition, different from the example of Table 18 above, the Subframe IE and the RB IE may not be included in the CoMP Hypothesis Set IE, but the CoMP Hypothesis IE includes the bitmap in which a position of each bit represents each PRB with frequency-first in the frequency-time resource indicated by the CoMP Hypothesis IE. More particularly, the first bit of the bitmap corresponds to PRB 0 of the first subframe in which the CoMP Hypothesis IE is valid, and the second bit of the bitmap corresponds to PRB 1 of the first subframe in which the CoMP Hypothesis IE is valid, and so does for other cases. When the bit corresponds to all PRBs in the first subframe, the bit corresponds to the PRB n the second subframe in the same way.

Differently, the CoMP Hypothesis IE may have a range of value that exceeds '1'. In this case, the values of each CoMP Hypothesis IE may be mapped to the value of each specific transmission power.

Table 19 exemplifies a range of the CoMP Hypothesis Set Element IE, the Subframe IE and the RB IE exemplified in Table 18 above.

TABLE 19

| Range bound | Explanation |
| --- | --- |
| maxnoofCoMPCells | Maximum number of cells in a CoMP hypothesis set. Value is 9. |
| maxSubframes | Maximum number of subframes. Value is 80. |
| maxRBs | Maximum number of RBs. Value is 110. |

Referring to Table 18 and Table 19, up to nine CoMP Hypothesis Set Element IEs may be included in each CoMP Hypothesis Set IE. That is, the CoMP Hypothesis information for up to nine cells may be included in each CoMP Hypothesis Set IE.

Up to 80 Subframe IEs may be included in each CoMP Hypothesis Set Element IE. That is, the CoMP Hypothesis information (i.e., Hypothetical resource allocation information) of up to 80 subframes may be indicated for each CoMP Hypothesis Set Element IE.

Maximum 110 RB IEs may be included in each SB IE. That is, two-dimensional Hypothesis information (i.e., Hypothetical resource allocation information) of up to 110 RBs in the frequency domain and up to 80 subframes in the time domain may be indicated for each CoMP Hypothesis Set Element IE.

The value of maxnoofCoMPCells, maxSubframes or maxRBs (i.e., 9, 80 and 110, respectively) exemplified in Table 19 is just an example, and the present invention is not limited thereto.

A Benefit Metric IE may be configured as Table 20 below.

Table 20 exemplifies a Benefit Metric IE according to an embodiment of the present invention.

integer value, for example, may be expressed by 0 to 100 or more integer value. When the Benefit Metric IE has a range of 0 to 100, 100 may indicate the maximum benefit and 0 may indicate the minimum benefit.

As described above, the Benefit Metric IE and the CoMP Hypothesis Set IE are always transmitted together with being included in the CoMP Information IE.

In this case, the Benefit Metric may have a dummy value or "no weight" value.

The description for the specific value of such a Benefit Metric may be given by any one of available states of the Benefit Metric. For example, when a transmitter node is a CCN, all of the Benefit Metric values (or bit strings) may have an identical value in order to efficiently transmit the CoMP Information IE without the Benefit Metric (i.e., no weight).

Otherwise, the Benefit Metric value may be signaled in an integer value form such as an integer (0, . . . , 100, . . . ) as represented in Table 20, and a specific value in the case (e.g., 0 or 100) may be treated as a dummy value or "no weight" value as a special value. As an example, in the case that a CCN transmits the CoMP Information IE, the Benefit Metric value does not express an actual benefit, but the CoMP Hypothesis (Hypotheses) itself transmitted together may be recognized as a meaning that indicates a transmission action such as muting/non-muting, and so on.

In addition, the Benefit Metric value may include a benefit value (i.e., a value for an amount of benefit which is

TABLE 20

| IE/Group Name | Presence | Range | IE type and reference | Semantics description |
| --- | --- | --- | --- | --- |
| Benefit Metric Element | | | | |
| > Subframe | | 1 . . . <maxSubframes> | | |
| >> RB | | 1 . . . <maxRBs> | | |
| >>> Benefit Metric | M | | INTEGER (0 . . . 100, . . . ) | Denote the amount of benefit for each RB when the associated CoMP Hypothesis Set IE is applied. Value 1 and 100 are ordered in increasing order of benefit. Value 100 indicates the maximum benefit. Value 0 indicates a dummy value or value "no weight". |

In Table 20, the description for each field is the same as those of Table 16 above, the description will be omitted.

The Benefit Metric Element IE may include a Subframe IE.

The Subframe IE indicates a subframe which is an object of the corresponding Benefic Metric Element IE.

The Subframe IE may be included up to the number of 'maxSubframes'.

The Subframe IE includes an RB IE.

The RB IE may be included in the Subframe IE as much as up to the number of 'maxRBs'.

The RB IE includes a Benefit Metric IE.

The Benefit Metric IE indicates an amount of benefit for each RB when the associated CoMP Hypothesis Set IE is applied. The Benefit Metric IE may be indicated as an anticipated when the associated CoMP Hypothesis Set IE is applied) only, and may not include the Subframe IE and the RB IE exemplified in Table 20. As such, in the case that the Benefit Metric value does not include the Subframe IE and the RB IE, it may be assumed that the Subframe IE and the RB IE included in the associated CoMP Hypothesis Set IE are the same.

The value of Benefit Metric value (i.e., 0 or 100) exemplified in Table 20 is just an example, and the present invention is not limited thereto.

Table 21 exemplifies a range of the Subframe IE and the RB IE exemplified in Table 20 above.

TABLE 21

| Range bound | Explanation |
| --- | --- |
| maxSubframes | Maximum number of subframes. Value is 80. |
| maxRBs | Maximum number of RBs. Value is 110. |

Referring to Table 20 and Table 21, up to 80 Subframe IEs may be included in one Benefit Metric Element IE. That is, the Benefit Metric information for up to 80 Subframe IEs may be included in each Benefit Metric Element IE.

Maximum 110 RB IEs may be included in each SB IE. That is, two-dimensional Hypothesis information of up to 110 RBs in the frequency domain and up to 80 subframes in the time domain may be indicated for each Benefit Metric Element IE.

The value of maxnoofCoMPCells or maxRBs (i.e., 80 and 110, respectively) exemplified in Table 21 is just an example, and the present invention is not limited thereto.

The two operations between nodes according to "Periodicity" field exemplified in Table 16 above will be described by reference to the drawing below.

FIG. 20 is a diagram illustrating a method for supporting a CoMP operation according to an embodiment of the present invention.

In the distributed coordination architecture, a first node may correspond to a first eNB and a second node may correspond to a second eNB. In this case, the first node and the second node may be connected through Xn (e.g., X2) interface.

On the other hand, in the centralized coordination architecture, a first node may correspond to a CCN and a second node may correspond to a member eNB. In addition, on the contrary, a first node may correspond to a member eNB and a second node may correspond to a CCN.

As described above, a CCN may be one of a plurality of eNBs that participates in the CoMP. In this case, a first node may correspond to a first eNB and a second node may correspond to a second eNB. In this case, the first node and the second node may be connected through Xn (e.g., X2) interface.

In addition, a CCN may be different entity from a plurality of eNBs that participates in the CoMP.

For example, when a CCN is an MME, the first node may correspond to the MME and the second node may correspond to a member eNB that participates in the CoMP. In addition, on the contrary, the first node may correspond to a member eNB and the second node may correspond to the MME. In this case, the first node and the second node may be connected through S1 interface.

As another example, in the case that a CCN is a central node which is not defined in the 3GPP LTE/LTE-A system, the first node may correspond to a central node and the second node may correspond to a member eNB that participates in the CoMP. In addition, on the contrary, the first node may correspond to a member eNB and the second node may correspond to a central node. In this case, the first node and the second node may be connected through a newly defined interface (e.g., C1 interface).

Referring to FIG. 20(a), the first node transmits a first CoMP Information Item IE that includes a Periodicity IE to the second node (step, S2011).

Here, the CoMP Information Item IE may include the information according to Table 16 above.

In addition, the CoMP Information Item IE may be transmitted through Load Information (or IE).

The node that transmits the CoMP Information Item IE may transmit the CoMP Information Item IE by arbitrarily selecting a transmission period for the transmission (actually, aperiodically).

However, in the case that the transmission period that may be selected by the transmission subject as such is requested or recommended from another node, it is characterized that the transmission is an operation transmitted on the corresponding indicated period when the node itself transmits the CoMP Information Item IE, and so on (i.e., in the case of receiving a transmission period from the first node, like the second node).

That is, when the first node that transmits the CoMP Information Item IE transmits the "Periodicity" field value with being configured as a specific value (e.g., 10 ms), the "Periodicity" field may have the meaning of requesting or recommending that the second node that receives the CoMP Information Item IE is to transmit the transmission period in which the second node transmits the CoMP Information Item IE to the first node again later on the indicated corresponding "Periodicity" field value (e.g., 10 ms). In other words, the "Periodicity" field may have the meaning of requesting or recommending a time interval between messages for transmitting the CoMP Information Item IE when the second node transmits the CoMP Information Item IE to the first node.

The second node transmits a second CoMP Information Item IE to the first eNB on the period according to the "Periodicity" field value which is requested or recommended by the first node (step, S2012).

Here, the CoMP Information Item IE may be transmitted through the Load Information message (or IE).

In addition, the "Periodicity" field value (i.e., transmission period of the CoMP Information Item IE) may be transmitted separately from the CoMP Information Item IE like the case of FIG. 20(b).

Referring to FIG. 20(b), the first node transmits the transmission period of the CoMP Information Item IE to the second node (step, S2021).

Here, the transmission period of the CoMP Information Item IE may be transmitted through a specific Invoke message (e.g., Invoke Indication IE) which is transmitted together with the CoMP Information Item IE except the CoMP Information Item IE or transmitted before the CoMP Information Item IE except the CoMP Information Item IE.

While a transmitter node (i.e., the first node) requests to transmit the CoMP Information Item IE to a receiver node (i.e., the second node), the case may have a meaning of requesting or recommending the transmission period of the CoMP Information Item IE that is going to be transmitted by the receiver node (i.e., the second node). In other words, the transmission period of the CoMP Information Item IE may mean the information for requesting or recommending a time interval between messages for transmitting the CoMP Information Item IE when the second node transmits the CoMP Information Item IE to the first node.

The second node transmits the CoMP Information Item IE to the first node on the transmission period of the CoMP Information Item IE which is requested or recommended by the first node (step, S2022).

Here, the CoMP Information Item IE may be transmitted through a Load Information message (or IE).

As such, the transmitter node transmits the CoMP Information Item IE to the receiver node, and accordingly, there is an advantage that the transmitter node may adjust the time for the receiver node to transmit the CoMP Information Item IE.

In particular, under the centralized coordination architecture, when a CCN transmits the CoMP Information Item IE to each member eNB, it may be implemented that the CCN may indicate the transmission period of the CoMP Information Item IE that each member eNBs are going to transmit later. Accordingly, there is an advantage that the transmission period of the CoMP Information Item IE is available to be adjusted such as the transmission period of the CoMP Information Item IE may be synchronized among the member eNBs. In the case that the transmission periods of the member eNBs are different, the efficiency of the global optimization performed by the CCN may be degraded. However, the improvement of performance may be expected when the CCN performs the CoMP coordination decision by synchronizing the transmission period of the CoMP Information Item IE among the member eNBs.

It is apparent that the "Periodicity" field proposed above may be generalized or extendedly applied to the operation of forwarding the periodicity together recommended even in the signaling format such as the Load Information message/ IE or other forms to support other operations as well as the CoMP operation. This will be described by reference to the drawing below.

FIG. 21 is a diagram illustrating a signaling method between eNBs to support the CoMP operation according to an embodiment of the present invention.

In the distributed coordination architecture, a first node may correspond to a first eNB and a second node may correspond to a second eNB. In this case, the first node and the second node may be connected through Xn (e.g., X2) interface.

On the other hand, in the centralized coordination architecture, a first node may correspond to a CCN and a second node may correspond to a member eNB. In addition, on the contrary, a first node may correspond to a member eNB and a second node may correspond to a CCN.

As described above, a CCN may be one of a plurality of eNBs that participates in the CoMP. In this case, a first node may correspond to a first eNB and a second node may correspond to a second eNB. In this case, the first node and the second node may be connected through Xn (e.g., X2) interface.

In addition, a CCN may be different entity from a plurality of eNBs that participates in the CoMP.

For example, when a CCN is an MME, the first node may correspond to the MME and the second node may correspond to a member eNB that participates in the CoMP. In addition, on the contrary, the first node may correspond to a member eNB and the second node may correspond to the MME. In this case, the first node and the second node may be connected through S1 interface.

As another example, in the case that a CCN is a central node which is not defined in the 3GPP LTE/LTE-A system, the first node may correspond to a central node and the second node may correspond to a member eNB that participates in the CoMP. In addition, on the contrary, the first node may correspond to a member eNB and the second node may correspond to a central node. In this case, the first node and the second node may be connected through a newly defined interface (e.g., C1 interface).

Referring to FIG. 21, the first node transmits an RSRP measurement and/or a CSI report transmission period to the second node (step, S2101).

Here, the RSRP measurement and/or the CSI report transmission period may be transmitted through a Load Information message, an Invoke message (e.g., an Invoke Indication IE, etc.), a Resource Status Request, and so on.

The RSRP measurement and/or the CSI report transmission period means the information for requesting or recommending a time interval between messages for the RSRP measurement and/or the CSI report transmission when the second node transmits the RSRP measurement and/or the CSI report to the first node.

The second node transmits the RSRP measurement and/or the CSI report to the first node on the RSRP measurement and/or the CSI report transmission period requested or recommended by the first node (step, S1602).

Here, the RSRP measurement and/or the CSI report may be transmitted through a Load Information message, a Resource Status Update message, and so on.

In the case, the information included in the RSRP measurement and/or the CSI report may be configured based on the above description of the present invention and the detailed description will be omitted.

Meanwhile, for the convenience of description, the RSRP measurement and/or the CSI report is illustrated in FIG. 21, but the first node may transmit the transmission period for one or more information such as an SRS reception power of the UE(s) going to be scheduled, a user perception throughput (UPT) of the UE(s) going to be scheduled, a Proportional Fair metric of the UE(s) going to be scheduled, a QCI of the UE(s) going to be scheduled, an improved RNTI, and the like to the second node.

The transmission period information means the information for requesting or recommending a time interval between messages for transmitting the corresponding information when the second node transmits the corresponding information to the first node.

Accordingly, the second node transmits the corresponding information to the first node on the transmission period of the corresponding information requested or recommended by the first node In addition, for the maxSubframes value (i.e., the maximum subframe number indicated by the CoMP Hypothesis IE) exemplified in Table 18 and Table 20, depending on whether the transmission node that actually transmits the IEs is a CCN or not, a specific restriction that may differentiate the maxSubframes value may be defined or configured for a UE.

For example, when a CCN transmits the CoMP Hypothesis Set IE represented in Table 18 and the Benefit Metric IE represented in Table 20, by configuring and transmitting the maxSubframes value in the CoMP Hypothesis Set IE of Table 18 as an actual meaningful value (e.g., 20 ms, etc.), the CCN may transmit a message of the CoMP coordination indication throughout many subframes, but the Benefit Metric IE represented in Table 20 transmitted together may differently configure the corresponding maxSubframes value. For example, the maxSubframes value of the Benefit Metric IE is set to 1 ms and the benefit metric value in this case is mapped to the special value (e.g., 0) so as to be ignored in a receiver node.

That is, when a CCN transmits such information, all of the benefit metric values are going to be treated as dummy values. Accordingly, the fact that all of the benefit metric values are set to 20 ms identically and inputted by a dummy value may cause a resource waste. Therefore, when the CCN transmits the information (e.g., when the benefit metric value is processed as the special value (e.g., 0)), a restriction, for example, that the maxSubframes value of the Benefit Metric IE is always to be specific X ms (e.g., X=1) may be defined or set to a UE.

On the contrary, when each member eNB transmits a message that includes the CoMP Hypothesis Set IE represented in Table 18 and the Benefit Metric IE represented in Table 20 (e.g., the benefit metric value is not processed by the special value, e.g., other normal value (e.g., 1 to 100) except 0), a specific restriction that the maxSubframes value of the CoMP Hypothesis Set IE of Table 18 is always fixed to specific Y ms (e.g., Y=1 ms) may be defined or set to a UE. In this case, the maxSubframes value in the Benefit Metric IE of Table 20 may be set to an actual meaningful value (e.g., 20 ms, etc.). In addition, an additional restriction that the maxSubframes value of the Benefit Metric IE is always to be fixed to specific Y ms (e.g., Y=1 ms) together may be defined or set to a UE.

In other words, when each member eNBs transmits the message, it is trying to provide the information that may help the CoMP coordination decision of a CCN. Since the member eNBs do not have any ground for providing other information in a unit of specific subframe in the CoMP Hypothesis Set IE of Table 18 (i.e., the member eNBs do not know whether neighboring cells preferred by the eNBs for a future time is mute, currently), it may be preferable to fix the maxSubframes value at the time as a specific Y ms (e.g., Y=1 ms).

Accordingly, it may also be preferable to put a restriction to fix the maxSubframes value in the Benefit Metric IE represented in Table 20 as Y ms (e.g., Y=1 ms) and to forward the benefit value for it only.

However, it may have another meaning to configure and transmit the maxSubframes value in the Benefit Metric IE as an actual meaningful value (e.g., 20 ms, etc) without the specific restriction.

That is, when it is determined for each member eNB, by providing the benefit value being set to a different value for a time axis according to an urgency of the type of the packet going to be scheduled to a specific UE which is considered for each RB. Accordingly, there is an effect of providing more information for the global optimization in a CCN.

For example, the corresponding member eNB j maps benefit metric=9 to subframes 1 to 7 for RB i, maps benefit metric=5 to subframes 8 to 13, and maps benefit metric=1 to subframes 14 to 20. This means, when a CCN interprets it, it may be anticipated that member eNB j is going to schedule a specific data packet (e.g., the types of data in which low latency is important such as a voice) of which the urgency is high in the corresponding RB i. Accordingly, when the muting pattern by the final global optimization is indicated to several cells, in the corresponding RB i, eNB j may make the coordination decision as non-muting.

On the contrary, when eNB j allocates low benefit metric value in an ahead subframe index for RB i and notifies by allocating high benefit metric value as going forward, it may be implemented that a CCN may interpret the packet considered in RB i is not a packet sensitive to latency.

General Apparatus to Which an Embodiment of the Present Invention May be Applied FIG. 22 illustrates a block diagram of a wireless communication apparatus according to an embodiment of the present invention.

Referring to FIG. 22, the wireless communication system includes an eNB 2210 and a plurality of pieces of UE 2220 located within the area of the eNB 2210.

The eNB 2210 includes a processor 2211, memory 2212, and a radio frequency (RF) unit 2213. The processor 2211 implements the functions, processes and/or methods proposed in FIGS. 1 to 21. The layers of a wireless interface protocol may be implemented by the processor 2211. The memory 2212 is connected to the processor 2211 and stores various pieces of information for driving the processor 2211.

The RF unit 2213 is connected to the processor 2211 and transmits and/or receives a radio signal.

The UE 2220 includes a processor 2221, memory 2222, and an RF unit 2223. The processor 2221 implements the functions, processes and/or methods proposed in FIGS. 1 to 21. The layers of a wireless interface protocol may be implemented by the processor 2221. The memory 2222 is connected to the processor 2221 and stores various pieces of information for driving the processor 2221. The RF unit 2223 is connected to the processor 2221 and transmits and/or receives a radio signal.

The memory 2212, 2222 may be inside or outside the processor 2211, 2221 and connected to the processor 2211, 2221 by various well-known means. Furthermore, the eNB 2210 and/or the UE 2220 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A scheme for signaling for CoMP operation in a wireless communication system according to an embodiment of the present invention has been chiefly illustrated as being applied to a 3GPP LTE/LTE-A system, but may be applied to various wireless communication systems in addition to the 3GPP LTE/LTE-A system.

What is claimed is:

1. A signaling method for a Coordinated Multi-Point Transmission and Reception (CoMP) operation between base stations in a wireless communication system, the method performed by a first base station (BS) and comprising:
transmitting, a first CoMP Information IE (Information Element) to a second BS,
wherein the first CoMP Information IE includes one or more information among a first CoMP Hypothesis Set IE which is a collection of a first CoMP Hypothesis IE for one or more cells, a first Benefit Metric IE related to the first CoMP Hypothesis Set IE, a first starting System Frame Number (SFN) IE and a first starting Subframe Number IE,
wherein the first CoMP Hypothesis IE is hypothetical PRB (Physical Resource Block)-specific resource allocation information for a cell,
wherein the first starting SFN IE indicates a starting radio frame number of the first CoMP information IE, and the first starting Subframe Number IE indicates the starting Subframe Number of the first CoMP information IE, and
wherein the first starting SFN IE and the first starting Subframe Number IE are included in the first CoMP information IE, only when the first Benefit Metric IE is a specific value; and
receiving a second CoMP information IE including a second Benefit Metric IE,
wherein a second subframe IE and a second RB (Resource Block) IE included in the second Benefit Metric IE are the same as a first subframe IE and a first RB IE included in the first CoMP Hypothesis Set IE associated with the second Benefit Metric IE when the second Benefit Metric IE includes only a Benefit Metric value, and
wherein the Benefit Metric value is set to a different value for each subframe according to an urgency of a packet type to be scheduled, in a specific RB related to a specific User Equipment (UE).

2. The signaling method of claim 1, wherein the first CoMP information IE further includes a periodicity IE that indicates a transmission period of the second CoMP information IE proposed by the first BS, when the second BS transmits the second CoMP information IE.

3. The signaling method of claim 2, wherein the second CoMP information IE is transmitted according to a period included in the periodicity IE from the second BS.

4. The signaling method of claim 2, wherein the periodicity IE is included in the first CoMP information IE only when the first Benefit Metric IE is a specific value.

5. The signaling method of claim 1, further comprising transmitting an Invoke message to the second BS, wherein the Invoke message includes periodicity information that indicates a transmission period of the second CoMP information IE proposed by the first BS, when the second BS transmits the second CoMP information IE.

6. The signaling method of claim 5, wherein the second CoMP information IE is transmitted according to a period included in the periodicity information from the second BS.

7. The signaling method of claim 1, wherein:
the first CoMP Hypothesis Set IE includes a Cell ID (identification) IE and the first CoMP Hypothesis IE; and
the first CoMP Hypothesis IE includes a bitmap of which position of each bit indicates each PRB with frequency-first in frequency-time resource.

8. The signaling method of claim 7, wherein a maximum number of subframes indicated by the first Benefit Metric IE and the first CoMP Hypothesis IE is differently configured depending on whether the first Benefit Metric IE is a specific value.

9. The signaling method of claim 1, wherein the first CoMP information IE and the second CoMP information IE are transmitted through a Load Information message.

10. The signaling method of claim 1, wherein:
the first CoMP Hypothesis Set IE and the first Benefit Metric IE are mandatory information elements of the first CoMP information IE; and
the first starting SFN IE and the first starting Subframe Number IE are optional information elements of the first CoMP information IE.

11. The signaling method of claim 10, wherein the specific value is a dummy value or a value indicating no weight.

12. A first base station (BS) for performing a signaling for a Coordinated Multi-Point Transmission and Reception (CoMP) operation between BSs in a wireless communication system, the first BS comprising:
a radio frequency (RF) unit for transmitting and receiving a radio signal; and
a processor for controlling the first BS,
wherein the processor is configured to perform:
transmitting, a first CoMP Information IE (Information Element) to a second BS,
wherein the first CoMP Information IE includes one or more information among a first CoMP Hypothesis Set IE which is a collection of a first CoMP Hypothesis IE for one or more cells, a first Benefit Metric IE related to the first CoMP Hypothesis Set IE, a first starting System Frame Number (SFN) IE and a first starting Subframe Number IE,
wherein the first CoMP Hypothesis IE is hypothetical PRB (Physical Resource Block)-specific resource allocation information for a cell,
wherein the first starting SFN IE indicates a starting radio frame number of the first CoMP information IE, and the first starting Subframe Number IE indicates the starting Subframe Number of the first CoMP information IE, and
wherein the first starting SFN IE and the first starting Subframe Number IE are included in the first CoMP information IE, only when the first Benefit Metric IE is a specific value; and
receiving a second CoMP information IE including a second Benefit Metric IE,
wherein a second subframe IE and a second RB (Resource Block) IE included in the second Benefit Metric IE are the same as a first subframe IE and a first RB IE included in the first CoMP Hypothesis Set IE associated with the second Benefit Metric IE when the second Benefit Metric IE includes only a Benefit Metric value, and
wherein the Benefit Metric value is set to a different value for each subframe according to an urgency of a packet type to be scheduled, in a specific RB related to a specific User Equipment (UE).

13. The first BS of claim 12, wherein:
the first CoMP Hypothesis Set IE and the first Benefit Metric IE are mandatory information elements of the first CoMP information IE; and
the first starting SFN IE and the first starting Subframe Number IE are optional information elements of the first CoMP information IE.

14. The first BS of claim 13, wherein the specific value is a dummy value or a value indicating no weight.

15. The first BS of claim 12, wherein the first CoMP information IE further includes a periodicity IE that indicates a transmission period of the second CoMP information IE proposed by the first BS, when the second BS transmits the second CoMP information IE.

16. The first BS of claim 15, wherein the second CoMP information IE is transmitted according to a period included in the periodicity IE from the second BS.

17. The first BS of claim 15, wherein the periodicity IE is included in the first CoMP information IE only when the first Benefit Metric IE is a specific value.

18. The first BS of claim 12, wherein the processor is further configured to perform transmitting an Invoke message to the second BS, wherein the Invoke message includes periodicity information that indicates a transmission period of the second CoMP information IE proposed by the first BS, when the second BS transmits the second CoMP information IE.

19. The first BS of claim 12, wherein:
the first CoMP Hypothesis Set IE includes a Cell ID (identification) IE and the CoMP Hypothesis IE; and
the first CoMP Hypothesis IE includes a bitmap of which position of each bit indicates each PRB with frequency-first in frequency-time resource.

20. The first BS of claim 12, wherein the first CoMP information IE and the second CoMP information IE are transmitted through a Load Information message.

* * * * *